United States Patent [19]
Phillips et al.

[11] Patent Number: 5,488,707
[45] Date of Patent: Jan. 30, 1996

[54] APPARATUS FOR PREDICTING OVERLAPPED STORAGE OPERANDS FOR MOVE CHARACTER

[75] Inventors: James E. Phillips, Binghamton; Stamatis Vassiliadis, Vestal, both of N.Y.

[73] Assignee: International Business Machines Corporation, Armonk, N.Y.

[21] Appl. No.: 920,941

[22] Filed: Jul. 28, 1992

[51] Int. Cl.⁶ .............................. G06F 9/34; G06F 12/06
[52] U.S. Cl. ........................................... 395/420; 395/375
[58] Field of Search ................................ 395/400, 425, 395/375; 364/200 MS File, 900 MS File, DIG. 1, DIG. 2

[56] References Cited

U.S. PATENT DOCUMENTS 5,278,960  1/1994  Shibuya .................................. 395/375
5,297,266  3/1994  Tanaka ................................... 395/400

*Primary Examiner*—Jack A. Lane
*Attorney, Agent, or Firm*—Lynn L. Augspurger; Laurence J. Marhoefer

[57] ABSTRACT

An apparatus is presented and proved for detecting storage operand overlap for instructions having identical overlap detection requirements as the move character (MVC) instruction. The apparatus is applicable to all Enterprise Systems Architecture (ESA)/390 addressing modes encompassing access register addressing for either 24 bit or 31 bit addressing. S/370 addressing in 24 bit and 31 bit modes are also supported by the proposed apparatus and treated as special cases of access register addressing. In addition, the apparatus is extended to support other addressing modes with an example provided to include a 64 bit addressing mode. A fast parallel implementation of the apparatus is also presented. The apparatus results in a one cycle savings for all invocations of the MVC instruction which comprises approximately 2% of the dynamic instruction stream of a representative instruction mix. The one cycle savings results in a 21 percent improvement in the performance of the execution of the MVC instruction for the frequent case (84%) when the operand length is less than or equal to eight bytes and a 9 percent improvement in performance for the less frequent case (16%) in which the operand length is greater than eight bytes.

7 Claims, 8 Drawing Sheets

CASE 6

CASE 7

CASE 8

CASE 9

CASE 10

CASE 11

CASE 12

APPARATUS FOR PREDICTING OVERLAPPED STORAGE OPERANDS FOR MOVE CHARACTER

FIELD OF THE INVENTION

These inventions relate to digital computer systems and particularly to an improvement in the execution of frequently used movement of one storage location to a second storage location by predicting that the source and destination locations overlap destructively thereby allowing immediate execution of the move without having to stall the execution in a pipelined digital computer system until a determination of the condition can be calculated.

GLOSSARY OF TERMS

While dictionary meanings are also implied by certain terms used here, the following glossary of some terms may be useful.

ESA/390 refers to and is a mark for the International Business Machines Corporation mainframe system architecture used in the Enterprise Systems Architecture machines in use today. This architecture is the standard for mainframe architecture throughout the world, and using the existing instructions is important to enable use of the existing architecture.

MVC is short for MOVE CHARACTER, an existing ESA/390 instruction.

NC is short for AND CHARACTER, an existing ESA/390 instruction.

OC is short for OR CHARACTER, an existing ESA/390 instruction.

XOR is shod for XOR CHARACTER, an existing ESA/390 instruction.

MVZ is shod for MOVE ZONES, an existing ESA/390 instruction.

MVN is shod for MOVE NUMERICS, an existing ESA/390 instruction.

SAR1 is shod for the first storage operand address.

SAR2 is shod for the second storage operand address.

AGEN and AG are used interchangeably for address generation.

BACKGROUND OF THE INVENTION

As background for our invention we will review some IBM Technical Disclosure Bulletins, so that the reader can more quickly follow our discussion and understand how our invention differs from prior art. Initially, it will be understood that our invention provides a prediction mechanism for detecting destructive storage operand overlap for MVC and instructions that can have operands that potentially overlap in a like manner to the MVC instruction. The invention is applicable to predicting destructive operand overlap for address calculations of the type used in the ESA/390 processor architecture. That it can be easily extended to support other architecture addressing modes is demonstrated by expanding the detection to include an assumed 64 bit addressing mode.

International Business Machines Corporation publishes a Technical Disclosure Bulletin, known as the TDB, about inventions made in IBM for public information. Turning now to the TDBs in this ad, we note that Ngai et al in TDB 12-82, Vol. 25, No. 7A, pp. 3569–3576, publish a fast algorithm for handling destructive operand overlap move instruction execution. The algorithm is suitable for MOVE CHARACTER, MOVE NUMERICS, and MOVE ZONES instruction types. The determination of the destructive operand overlap condition; however, is assumed and is not specified. The prediction of this assumed condition, on the other hand, is the subject of our invention.

Beetcher et al in TDB 06-81, Vol. 24, No. 1A, pp. 192–197, define a Move Long Embellished (MLE) instruction in which the behavior of the instruction depends on whether operands are overlapped. The instruction definition is specified in their TDB; however, the mechanism for detecting storage operand overlap is not defined.

Ngai et al in TDB 06-76 Vol. 19, No. 1, pp. 61–64, publish a hardware mechanism for determining destructive storage operand overlap by using bits of the destination address and source address to access a read only storage ("ROS") which at each memory location contains an indicator as to whether storage operand overlap may occur from the combination (over-indication). All bits of the address are used. No explaination for supporting multiple addressing modes is provided. In addition, their method determines whether the condition exists for the dataflow width of the machine. In our invention, we predict precisely whether storage operands possess destructive operand overlap as indicated by the architecture. The condition is generated if any byte within the operands overlap. Trace analysis indicate that conditions for which operands overlap with the operand length being less than storage data bus widths of a doubleword commonly found in current high performance processor implementations is infrequent; therefore, little performance is lost by detecting overlap for the general case. In any case, our indication is precise and not an over-indication. Secondly, we detect the condition totally with logic and do not rely upon an array access. Therefore, our determination should be faster and more cell efficient than the published mechanism. Finally, the published mechanism does not predict the overlap condition from bases, displacements and operand length as we do, but from the address after they are generated.

Brooks in TDB 06-76 Vol. 19, No. 1, pp. 222–224, published an operand consistency attendent (OCA) to prevent simultaneous, incompatible accesses to data fields. The hardware mechanism described determines if the operands overlap by comparing beginning and ending operand addresses. As such, not only are operand beginning address calculated prior to the determination, but also ending addresses. A mechanism for speeding up the comparisons once these beginning and ending addresses are available that approximates that the operands overlap is presented. We, on the other hand, determine the storage operand overlap condition in parallel with the generation of the source and destination addresses (beginning addresses for the TDB). In addition, our indication is precise.

Baker et al in TDB 01-82 Vol. 24, No. 8, pp. 4018–4022, published algorithms for executing many instructions whose behavior is architected, when operands overlap, to proceed as if the operands were processed byte by byte. It is assumed that the detection of operand overlap is already known and the algorithm for the executions are then provided. No mechanism is shown for detecting the operand overlap condition which is the subject of our invention.

SUMMARY OF THE INVENTION

Our invention deals with the use of specialized hardware, that executes in parallel with the generation of the storage addresses, to predict whether two storage operands destructively overlap. The behavior of storage to storage instruction execution is often architected to proceed as if the instruction is executed on the storage operands byte by byte. This can be accomplished by executing all of these operations on a byte by byte basis; however, if source and destination operands do not destructively overlap, then the operation can be executed on multiple bytes in parallel and still appear to occur byte by byte. Therefore, the execution speed of the instruction can be improved by detecting that the storage operands overlap destructively, and if not, allowing the execution to proceed on multiple bytes at a time, but performing the operation on a byte by byte basis if the operands do overlap destructively. To meet architectural requirements, the destructive operand overlap condition must be known before the fetched data can be stored. In some cases, useful work can be accomplished while storage operand overlap is being determined; however, for the frequently used MOVE CHARACTER (MVC) instruction, no useful work is available to fill the gap. Therefore, the execution must stall until the operand overlap condition is determined.

In the past, destructive storage operand overlap has been detected by first calculating the storage addresses for the source and destination operands followed by a comparison of the storage addresses to determine if:

$$0 \leq SAR1-SAR2 \leq L$$

in which SAR1 and SAR2 represent the storage operand addresses for the destination and the source operands, respectively, and L represents the length of the operands. In pipelined processors, such detection has taken at least one additional cycle beyond the generation of the storage addresses. Therefore, at least one stall cycle would be required before execution of the MVC instruction could proceed. Our invention allows the storage operand overlap condition for the MVC instruction to be determined directly from the base and displacement for both source and destination operands of the MVC instruction and the length of the operands as specified in the instruction, in parallel with the use of the bases and displacements for calculating the source and destination storage addresses. By performing this determination in parallel with the generation of the source and destination storage addresses, no stall cycles are required during the execution of the frequently invoked MVC instruction. A savings of one stall cycle for the MVC instruction alone, represents a 21% improvement in the execution speed of the MVC instruction for the more frequent case (84%) when the operand length is less than or equal to eight bytes and a 9% improvement for the case (16%) when the operand length is greater than eight bytes. Due to the frequency of the MVC instruction, this reflects in a net reduction in the CPI for a representative instruction mix, for the MVC instruction alone, of 0.02 CPI which is achieved with minimum additional hardware. The invention, designed for an ESA/390 processor, can predict destructive storage operand overlap for all addressing modes known to that architecture. It is also demonstrated that the invention can be extended to other architectures by expanding the predictor to support an assumed 64 bit addressing mode.

These and other improvements are set forth in the following detailed description. For a better understanding of the invention with advantages and features, refer to the description and to the drawings.

BRIEF DESCRIPTION OF THE DRAWINGS

Our detailed description explains the preferred embodiments of our invention, together with advantages and features, by way of example with reference to the following drawings.

DETAILED DESCRIPTION OF THE INVENTION

Figure 1:
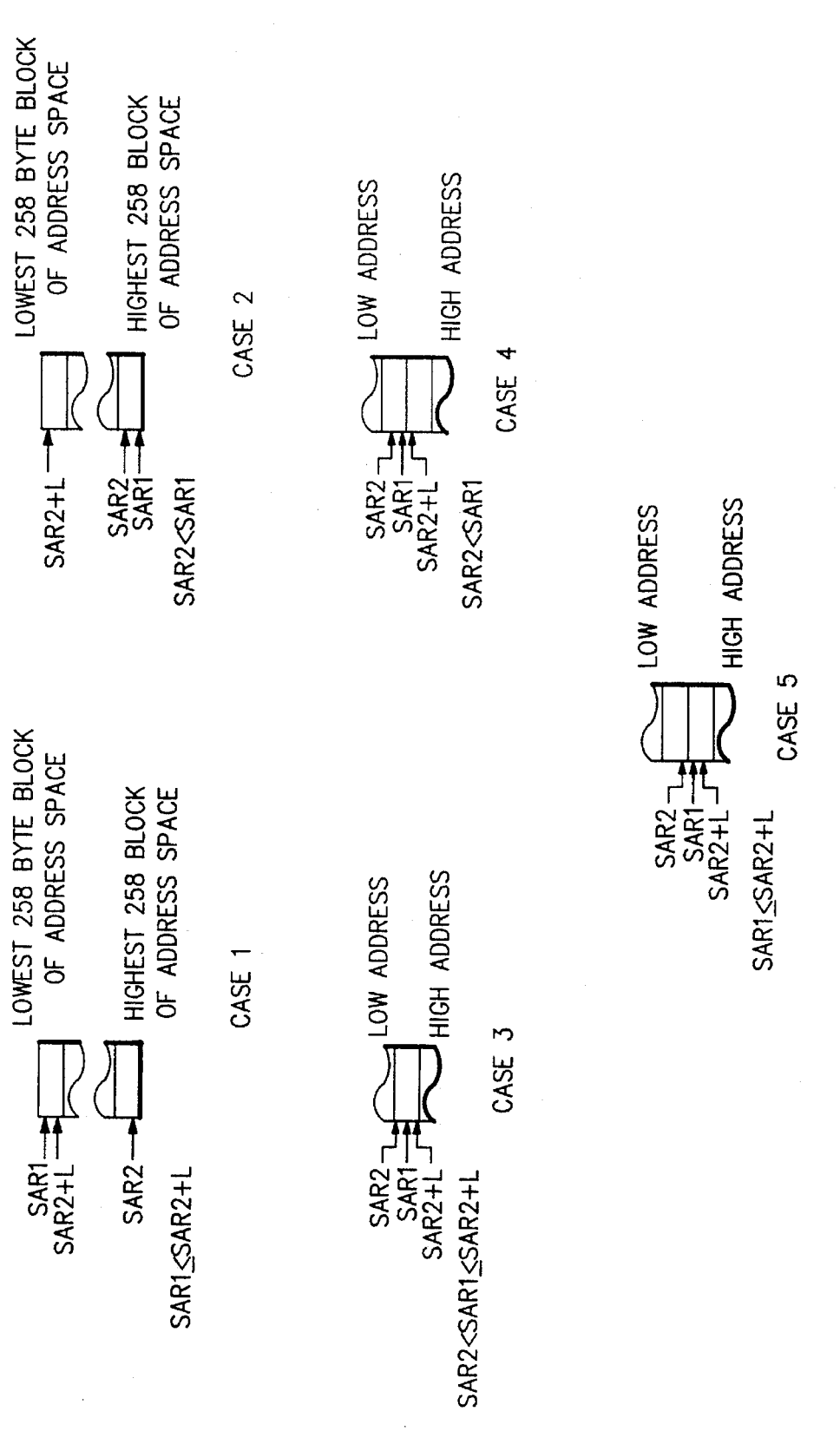
FIG. 1 shows all unique cases for which storage operands can possess destructive storage operand overlap.

Before considering our preferred embodiments in detail, it is worthwhile to develop the conditions that will be used to predict that a source and destination address overlap destructively.

Architectures, such as the IBM ESA/390 architecture, may require that the execution of instructions on overlapped storage operands perform in an architected manner. This can require the detection of such overlapping conditions before the instruction can begin execution. Given the frequency of some of these type instructions, a prime example being the MOVE CHARACTER (MVC) instruction in ESA/390, and the number of cycles required for their execution for most invocations of the instruction, a substantial penalty may be payed when this process is implemented with a serial detection of operand overlap. This suggests the need for the fast determination of operand overlap. For the SS instruction MVC, just mentioned, and other SS instructions AND character (NC), OR character (OC), XOR CHARACTER (XC), MOVE ZONES (MVZ), and MOVE NUMERICS (MVN), found in the ESA/390 architecture, the conditions for overlapped operands can be expressed as:

$$0 \leq SAR1-SAR2 \leq L$$

in which SAR1 and SAR2 represent the storage addresses for the destination and source operands, respectively, and L represents the length of the operands. Of the instructions contained in the above list, MVC occurs the most frequently in an instruction stream. For this reason, the above overlap will be referred to as MVC type overlap. Furthermore, overlap can also occur for other ESA/390 instructions. These instructions include the ESA 390 instructions PACK and ZAP in which overlap occurs when $$SAR2 \leq SAR1+L1 < SAR2+L2$$

UNPK in which overlap occurs when $$SAR2 \leq SAR1+L1 \leq SAR2+(2 \star L2)-2$$

and TR and TRT in which overlap occurs when $$SAR2 \leq SAR1+L1 < SAR2+255$$

MVC type overlap must be detected precisely whereas overlap for this latter group of instructions can be over indicated. Overindication of overlap can be accomplished by $$|SAR1-SAR2| \leq 15$$

for PACK, ZAP, and UNPK or by $$|SAR1-SAR2| \leq 255$$

for TR and TRT.

As already stated, MVC is one of the more frequent instructions that occurs in a representative instruction mix. For this reason, the mechanism used to detect overlap can impact the cycles per instruction, CPI, for a given design. In prior art, MVC overlap detection has consisted of calculating both storage operand addresses, SAR1 and SAR2, followed by a comparison of SAR1 with SAR2 and SAR1−SAR2 with L. Such an implementation can lead to an underutilization of the storage bus, resulting in a performance bottleneck, since the AGEN ALU is required for the calculation of SAR1, SAR2, and the comparison of SAR1 with SAR2. As an example of the degradation in performance that can result from the detection of overlap, consider the PU design for a high performance superscalar processor using the following pipeline structure:

ID-AG-EX for single cycle instructions and

| ID - AG - CA |
| --- |
| μF - AG - EX | where μF represents microword fetch, for two cycle instructions which have a storage access. In this pipeline ID stands for instruction decode, AG represents the address generation stage, CA represents data cache access, and EX represents the instruction execution. The put-away for the instruction is hidden; i.e., results of the execution can be by-passed as inputs to the required function unit for use in the following execution cycle. The PU is assumed to be designed with the capability to execute up to three ESA/390 instructions currently. A result of this capability is the inclusion of two address generation ALU's in the dataflow. The suggestion here is that for the SS instructions such as MVC, the source and destination storage addresses can be generated simultaneously during the AG cycle that follows decode of the MVC instruction. All instructions of the processor are microcode controlled with single cycle instructions invoking one microinstruction and multiple cycle instructions invoking a microcode routine. MVC falls into the multiple cycle instruction category; therefore, multiple microinstructions are invoked during its execution. For such a routine, the execution would result in the following pipeline sequence:

| First microword | ID - AG - CA | |
| --- | --- | --- |
| Second microword | | μF - AG - EX |
| Third microword | | μF - AG - EX | where μF represents microword fetch, with the sequence repeated to complete the instruction execution. The following describes a possible implementation of the MVC instruction which will be used in the following to describe our invention, the operand overlap prediction apparatus. For this implementation, the first microinstruction specifies a load from the storage location addressed by the first operand. During the AG cycle of this first microinstruction, both operand addresses are calculated by the two AGEN ALU's, and a fetch command for operand one is formulated and sent to the data cache. On the next cycle, data fetched from the data cache is placed on the data bus and accepted by the processor. Since the processor can by-pass data fetched from the cache to the data bus, it is conceivable that a store command could be formulated during this cycle for storing the fetched data into the data cache. Compliance with the architecture, however, requires that operand overlap be known before the data can be stored. With prior art, the storage operand addresses, SAR1 and SAR2, which are calculated during the AG cycle of the first instruction must be by-passed in the next cycle to overlap detection logic to determine overlap during the AG cycle of the second microinstruction. The results of the overlap detection are then used as a branch condition to determine which of two microroutines is to be accessed to execute MVC in a fashion that conforms to the architecture. As a result, with prior ad, the second microinstruction becomes effectively a NOP that allows overlap to be determined before accessing the appropriate microroutine to store the fetched data. Consequently, the storage bus is underutilized. This underutilization can be reduced if the overlap condition can be predicted during the AG cycle of the first microword and made available as a branch condition for selecting the appropriate routing when fetching the second microword. In the following, our invention is presented that allows the prediction of the overlap condition in parallel with the calculation of the two storage operand addresses, SAR1 and SAR2. In this manner, one cycle can be saved for each invocation of the instructions that require the detection of MVC type overlap. Using a representative instruction mix, the cycles required to execute the MVC instruction for the frequent case (84%) in which MVC is invoked with an operand length less than or equal to eight is reduced from an average of 4.7 cycles to an average of 3.7 cycles, an improvement of 21%. For the less frequent case (16%) in which the operand length for MVC is greater than eight, the number of execution cycles is reduced from 11.8 cycles to 10.8 cycles, an improvement of 9%. The net reduction in the CPI is 0.02 which is achieved with minimum additional hardware.

Figure 2A:
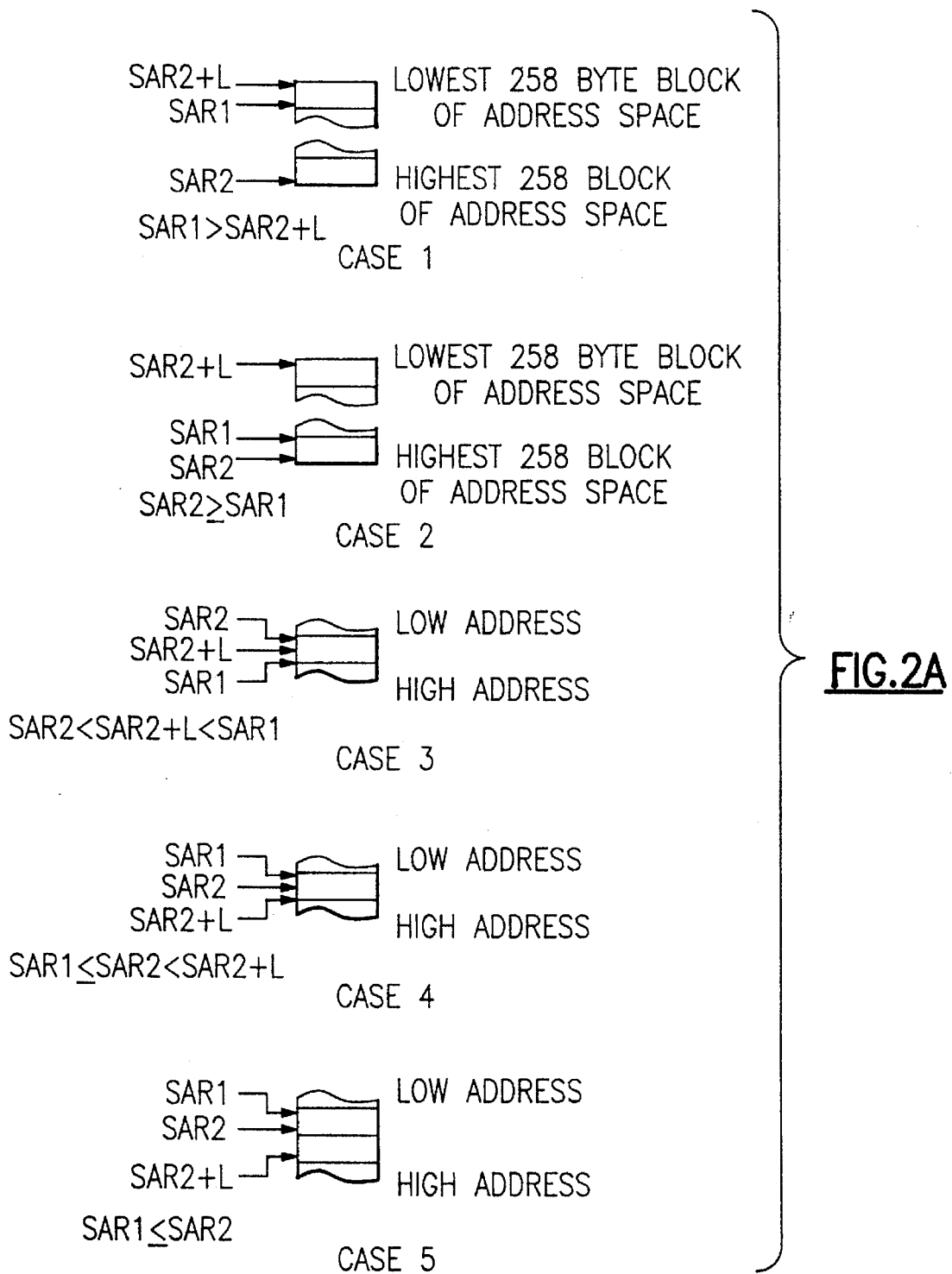
FIGS. 2A–2C show all unique cases for which storage operands do not possess destructive storage operand overlap.
Figure 2B:
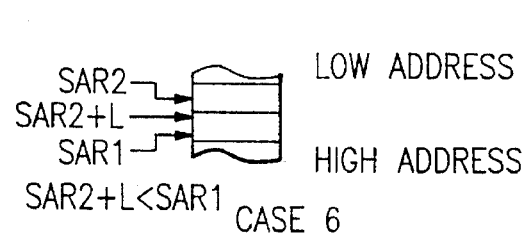
Figure 2B:
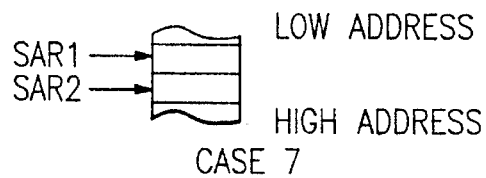
Figure 2B:
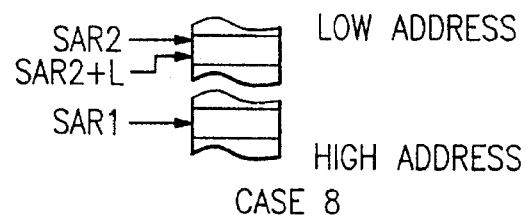
Figure 2B:
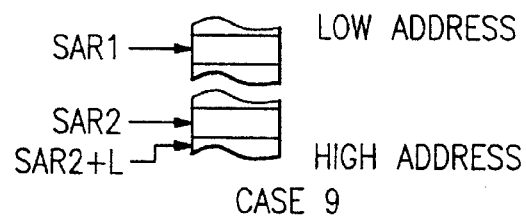
Figure 2B:
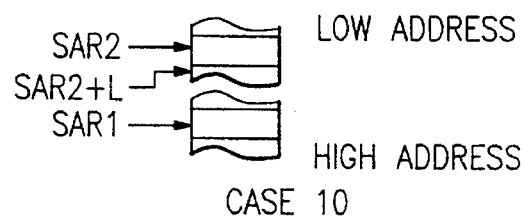
Figure 2C:
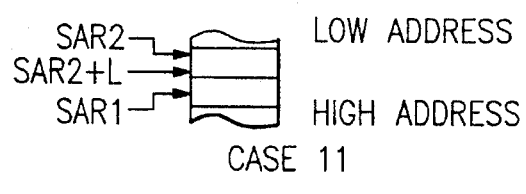
Figure 2C:
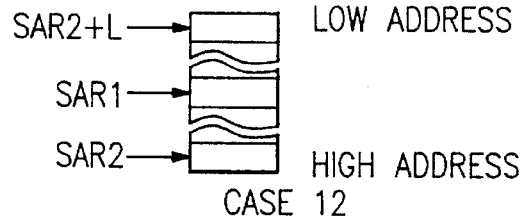

Address conditions that lead to overlap can be divided into five cases. These cases are shown in FIG. 1. In the first case, overlap occurs because the source operand wraps across the high storage boundary to low storage and overlaps with the destination operand address at low storage. In the second case, the source operand and the destination operand both wrap from high storage to low storage. In this case, the destination operand lies above the source operand and continues at the low address position. In the third case, both the source and destination addresses begin in the same 256 byte block within storage with all of the source operand lying within this 256 byte block. In case four, both operands begin within the same 256 byte block somewhere in the middle of storage and both operands spill into the next sequential 256 byte block. Finally, in case five, the destination operand begins in the next sequential block from the source operand. The source operand spills into this sequential block and overlaps the destination. The non-overlap cases are comprised of all the remaining possibilities that are not included in the overlap cases. These cases are provided in FIGS. 2A–2C. All of the cases for both overlap and non-overlap are used in the following to develop our invention for detecting overlap for all addressing modes supported by the ESA/390 architecture. These modes included 24 and 31 bit access register modes. In addition, address calculation of a 64 bit base and 12 bit displacement will also be assumed. Twenty-four and thirty-one bit addressing modes are also included by virtue of the fact that they can be considered as subsets of the 24 and 31 bit access register modes provided in the ESA/390 architecture. The wrap cases such as cases 1 and 2 of FIG. 1 will be excluded from consideration for the addition of the 64 bit base with the 12 bit displacement by assuming that the MSB of the 64 bit address must be zero to have a valid address while wrapping is defined to occur at the $2^{64}-1$ address boundary. Thus memory addressing can not occur at the highest 256 byte block of the virtual address space for this addressing mode. In the discussion to follow, a two's complement number is represented by a capital letter, for example A. The two's complement number consists of a number of bits, m, that can be denoted as $a_i$ where $0 \leq i \leq m-1$ with $a_0$ representing the most significant bit, MSB, and $a_{m-1}$ representing the least significant bit, LSB. Furthermore, the notation $A(i:j)$ where $i \leq j \leq j \leq m-1$ will be used to denote a number comprised of the bits within A that are between and include i and j. Using this notation, the following theorems are proven as the basis for our invention for detecting MVC type overlap.

Theorem 1

The subtraction of two implicit, positive, two's complement numbers, A–B, using two's complement arithmetic will produce a carry from bit position i into the next most significant bit position, i–1, if $A \geq B$ where $A=0\|A(i:m-1)$ and $B=0\|B(i:m-1)$.

Proof:

For the case in which $A(i:m-1)>B(i:m-1)$, $\exists$ some j such that $a_j=1$ and $b_j=0$ and $a_p=b_p$ for all p such that $i \leq p < j$. To perform the two's complement subtraction, A–B, A is added to the one's complement of B with a hot one supplied into position m–1. But since B is one's complemented, then $\overline{b_p}=\overline{a_p}$ while $a_j=1$ and $\overline{b_j}=1$. Thus, A–B will produce a carry from j into j–1. At position j–1, however, either $a_{j-1}=1$ and $\overline{b_{j-1}}=0$, or $a_{j-1}=0$ and $\overline{b_{j-1}}=1$ since $\overline{b_j}=\overline{a_j}$. Therefore, the carry into j–1 added to $a_{j-1}$ and $\overline{b_{j-1}}$ will produce a carry into j–2. Identical considerations apply to each bit position q, $i+1 \leq q \leq j-2$, as applied to j–1 so that at bit position i, the carry into i is a one while either $a_i$ or $\overline{b_i}$ but not both are one. A carry at bit position i into i–1, therefore, will be produced.

For the case in which $A(i:m-1)=B(i:m-1)$, $a_j=b_j$ for all $i \leq j \leq m-1$. Since B is to be complemented before the addition, then each and every bit position, j, will consist of a one to be added to a zero. Therefore, since a hot one is provided into the LSB position, a carry will be produced at m–1. This carry propagates into the position m–2 at which a carry is produced into m–3. The carry continues to propagate through each and every bit position, j, producing a carry from bit i into i–1.

QED

Theorem 2

The subtraction of two implicit, positive, two's complement numbers A–B using two's complement arithmetic will not produce a carry from bit position i into the more significant position i–1 if $A<B$ where $A=0\|A(i:m-1)$ and $B=0\|B(i:m-1)$.

Proof:

For $A(i:m-1)<B(i:m-1)$, $\exists$ some j such that $a_j=0$ and $b_j=1$ and $a_p=b_p$ for all p such that $i \leq p < j$. To perform the two's complement subtraction, A–B, A is added to the one's complement of B with a hot one supplied into position m–1. But since B is one's complemented, then $\overline{b_p}=\overline{a_p}$ while $a_j=0$ and $\overline{b_j}=0$. Because $a_j$ and $\overline{b_j}$ are both zero's, then the carry from into j–1 will be a zero no matter the value of $c_{j+1}$, the carry into position j. Thus, A–B will not produce a carry from j into j=1. At position j–1 either $a_{j-1}=1$ and $\overline{b_{j-1}}=0$, or $a_{j-1}=0$ and $\overline{b_{j-1}}=1$ since $\overline{b_j}=\overline{a_j}$. Therefore, the lack of a carry into j–1 implies that the addition of $a_{j-1}$, $\overline{b_{j-1}}$ and the carry into j–1, $c_{j-1}$, will not produce a carry into j–2. Identical considerations apply to each bit position q, $i+1 \leq q \leq j-2$ as applied to j–1 so that at bit position i, the carry into i is a zero while either $a_i$ or $\overline{b_i}$ but not both are one. Therefore, no carry will be produced from bit i into i–1.

QED

The continued development of our invention for detecting MVC type operand overlap makes use of the following notation. First, SAR2 and SAR1 will be designated by A and B, respectively, each having individual bits designated as $a_i$ and $b_i$, respectively, where $0 \leq i \leq 63$. The eight bit operand length designated as OL(0:7) will be designated as L when concatenated on the left with 56 zero's. Therefore, L, is zero for $0 \leq i \leq 55$ and is OL(0:7) for $56 \leq i \leq 63$. The following add/subtract combinations of A, B, and L will be needed in the following discussion. These combinations along with their designations are: 1. A–B designated as $\Delta$ having individual bits designated as $\delta_i$, and carries from one bit position to the next designated as $\kappa_i$; 2. A+L designated as E having individual bits $\epsilon_i$ and carries designated as $\gamma_i$; 3. A+L designated as S with individual bits $S_i$ and carries designated as $c_i$; and 4. A–B designated as $S^\dagger$ having individual bits designated as $S_i^\dagger$ and carries designated as $\lambda_i$. This notation is summarized in Table 1.

TABLE 1

Notation for Developing MVC Type Overlap Detect Apparatus

| Entity | Representation | Char Rep | Bit Rep | Carry Rep |
|---|---|---|---|---|
| SAR2 | — | A | $a_i$ | — |
| SAR1 | — | B | $b_i$ | — |
| SAR2 – SAR1 | A – B | $\Delta$ | $\delta_i$ | $\kappa_i$ |
| SAR2 + L | A + L | E | $\epsilon_i$ | $\gamma_i$ |
| (SAR2 – SAR1) + L | $\Delta$ + L | S | $S_i$ | $c_i$ |
| (SAR2 + L) – SAR1 | E – B | $S^\dagger$ | $S_i^\dagger$ | $\lambda_i$ |

Using the above notation, the following theorems hold true.

Theorem 3

If storage operands 1 and 2 possess MVC type overlap and SAR1 is mapped above SAR2 when SAR2 is within the high 256 byte block and SAR1 is within the low 256 byte block of the address space, then $\delta_i=1$ for $0 \leq i \leq 55$.

Proof:

The theorem must be proven for each of the cases shown in FIG. 1 for each of the three addressing modes provided by the ESA/390 architecture. The representation of storage address for each of the addressing modes are shown in Table 2 on page 17.

TABLE 2

Address Representation for ESA/390 and Assumed 64 bit addressing mode

| Mode | Address Representation |
|---|---|
| 24 bit access register (AR 24 bit) mode | $a_0\ a_1\ \ldots\ a_{31}\ 0\ 0\ \ldots\ 0\ a_{40}\ a_{41}\ \ldots\ a_{55}\ a_{56}\ a_{57}\ \ldots\ a_{63}$ |
| 31 bit access | $a_0\ a_1\ \ldots\ a_{31}\ 0\ a_{33}\ \ldots\ a_{55}\ a_{56}\ a_{57}\ \ldots\ a_{63}$ |

TABLE 2-continued

Address Representation for ESA/390 and
Assumed 64 bit addressing mode

| Mode | Address Representation |
|---|---|
| register (AR 31 bit) mode 64 bit addressing | $0\ a_1\ \ldots\ a_{55}\ a_{56}\ a_{57}\ \ldots\ a_{63}$ |

In Table 2 bit positions of SAR2 that are known to be zero are shown to be zero while bit positions that are either one or zero are represented as a subscripted a, the subscript representing the bit position within the variable, since SAR2 has earlier been represented as A. SAR1 can be similarly represented by substituting b for a in the representation. Using this representation, each of the cases shown in FIG. 1 must be considered. For the cases in which SAR2 is in the high 256 byte block and SAR1 within the low 256 byte block of the address space, mapping SAR1 above SAR2 can be accomplished by extending the address by one bit position and forcing the bit position to a one. Thus, for a 24 bit address space, a 25th bit would be concatenated to the MSB of the address and be forced to a one. For the representation of the address as shown in Table 2, the address space is already extended for each of the addressing modes with bit positions being zero's as shown in the table. Mapping SAR1 above SAR2 for this representation: therefore, consists only of forcing the next more significant bit position to a 1. For example, 24 bits of address would required the least 24 bit positions of the address which for the representation in Table 2 correspond to bits 40 to 63. Mapping SAR1 above SAR2 for 24 bit addressing would consist of forcing bit 39 to a one. Similarly, for 31 bit addressing, mapping SAR1 above SAR2 consists of forcing bit 32 of the address to a one.

Theorem 3, Case 1

Case 1 is characterized by A lying within the high 256 byte block of the address space and B lying within the low 256 byte block with the most significant bits of A equal to that of B. Because A lies within the high 256 byte block and B lies within the low order 256 byte block within the address space, B must be mapped above A. In addition, $B(56:63) \leq E(56:63)$ and $E(56:63)<A(56:63)$ so that $A(56:63)>B(56:63)$. Therefore, by theorem 1, $\kappa_{56}=1$. All three addressing modes are considered below.

AR 24 Bit Mode For this addressing mode, mapping B above A consists of forcing bit 39 to a logic 1. Because bit positions more significant than 39 are equal, $a_i=b_i$ for $i \leq 38$. As a result, A–B can be represented as:

$$a_0\ a_1\ \ldots\ a_{31}\ 0\ 0\ \ldots\ 0\ 1\ 1\ \ldots\ 1\ a_{56}\ a_{57}\ \ldots\ a_{63}$$
$$\overline{a_0}\ \overline{a_1}\ \ldots\ \overline{a_{31}}\ 1\ 1\ \ldots\ 0\ 1\ 1\ \ldots\ 1\ \overline{b_{56}}\ \overline{b_{57}}\ \ldots\ \overline{b_{63}}$$

with a hot one implicitly forced at bit position 63. Because $\kappa_{56}=1$ and because each bit position $40 \leq i \leq 55$ possesses two ones to be added to the carry into that position, $\delta_i=1$ with $\kappa_i=1$ for all $40 \leq i \leq 55$. At bit position 39, two zero's are to be added with $\kappa_{40}$ which is one so that $\delta_{39}=1$ with $\kappa_{39}=0$. For each bit position $0 \leq i \leq 38$ a zero is added to a one and a carry of zero. Thus, $\delta_i=1$ and $\kappa_i=0$ for all $0 \leq i \leq 38$ from which it follows that $\delta_i=1$ for all $0 \leq i \leq 55$.

AR 31 Bit Mode For this addressing mode, mapping B above A consists of forcing bit 32 to a logic 1. Because bit positions more significant than 32 are equal, $a_i=b_i$ for $i \leq 31$. As a result, A–B can be represented as:

$$a_0\ a_1\ \ldots\ a_{31}\ 0\ 1\ \ldots\ 1\ a_{56}\ a_{57}\ \ldots\ a_{63}$$
$$\overline{a_0}\ \overline{a_1}\ \ldots\ \overline{a_{31}}\ 0\ 1\ \ldots\ 1\ \overline{b_{56}}\ \overline{b_{57}}\ \ldots\ \overline{b_{63}}$$

with a hot one implicitly forced at bit position 63. As for 24 Bit addressing, because $\kappa_{56}=1$ and because each bit position $33 \leq i \leq 55$ possesses two ones to be added to the carry into that position, $\delta_i=1$ and $\kappa_i=1$ for all $33 \leq i \leq 55$. At bit position 32, two zero's are to be added with $\kappa_{33}$ which is one so that $\delta_{32}=1$ with $\kappa_{32}=0$. For each bit position $0 \leq i \leq 31$ a zero is added to a one and a carry of zero. Thus, $\delta_i=1$ and $\kappa_i=0$ for all $0 \leq i \leq 31$ from which it follows that $\delta_i=1$ for all $0 \leq i \leq 55$.

64 Bit Addressing Case 1 can not occur for 64 bit addressing. As a result, no mapping of B above A must be done for 64 bit addressing to accommodate this case.

Theorem 3, Case 2

Case 2 is characterized by both B and A lying within the highest order 256 byte block in the address space with $A(56:63)<B(56:63)$. Thus by theorem 2, $\kappa_{56}=0$.

AR 24 Bit Mode Bit positions more significant than bit 40 are equal for B and A so that $a_i=b_i$ for $i \leq 39$. As a result, A–B can be represented as:

$$a_0\ a_1\ \ldots\ a_{31}\ 0\ 0\ \ldots\ 0\ 1\ 1\ \ldots\ 1\ a_{56}\ a_{57}\ \ldots\ a_{63}$$
$$\overline{a_0}\ \overline{a_1}\ \ldots\ \overline{a_{31}}\ 1\ 1\ \ldots\ 1\ 0\ 0\ \ldots\ 0\ \overline{b_{56}}\ \overline{b_{57}}\ \ldots\ \overline{b_{63}}$$

with a hot one implicitly forced at bit position 63. Because $\kappa_{56}=0$ and because each bit position $0 \leq i \leq 55$ possesses a single one and a single zero to be added to the carry into that bit position, the result at each bit is $\delta_i=1$ with $\kappa_i=0$. Therefore, $\delta_i=1$ for all $0 \leq i \leq 55$.

AR 31 Bit Mode Bit positions more significant than bit 33 are equal for B and A so that $a_i=b_i$ for $i \leq 32$. As a result, A–B can be represented as:

$$a_0\ a_1\ \ldots\ a_{31}\ 0\ 1\ \ldots\ 1\ a_{56}\ a_{57}\ \ldots\ a_{63}$$
$$\overline{a_0}\ \overline{a_1}\ \ldots\ \overline{a_{31}}\ 1\ 0\ \ldots\ 0\ \overline{b_{56}}\ \overline{b_{57}}\ \ldots\ \overline{b_{63}}$$

with a hot one implicitly forced at bit position 63. Because $\kappa_{56}=0$ and because each bit position $0 \leq i \leq 55$ possesses a single one to be added to a zero and the carry into that bit position, then $\delta_i=1$ with $\kappa_i=0$. Therefore, $\delta_i=1$ for all $0 \leq i \leq 55$.

64 Bit Addressing Case 2 can not occur for 64 bit addressing.

Theorem 3, Cases 3 and 4

These cases are characterized by B and A both lying within identical 256 byte blocks of the address space with $A(56:63)<B(56:63)$. By theorem 2, $\kappa_{56}=0$. The 256 byte block in which both B and A lie is arbitrary. AR 24 Bit Mode Bit positions more significant than bit 40 are equal for B and A so that $a_i=b_i$ for $i \leq 39$. As a result, A–B can be represented as:

$$a_0\ a_1\ \ldots\ a_{31}\ 0\ 0\ \ldots\ 0\ a_{40}\ a_{41}\ \ldots\ a_{55}\ a_{56}\ a_{57}\ \ldots\ a_{63}$$
$$\overline{a_0}\ \overline{a_1}\ \ldots\ \overline{a_{31}}\ 1\ 1\ \ldots\ 1\ \overline{a_{40}}\ \overline{a_{41}}\ \ldots\ \overline{a_{55}}\ \overline{b_{56}}\ \overline{b_{57}}\ \ldots\ \overline{b_{63}}$$

with a hot one implicitly forced at bit position 63. Because $\kappa_{56}=0$ and because each bit position $0 \leq i \leq 55$ possesses a single one to be added with a zero and the carry into that bit position, $\delta_i=1$ and $\kappa_i=0$. Thus, $\delta_i=1$ for all $0 \leq i \leq 55$.

AR 31 Bit Mode Bit positions more significant than bit 33 are equivalent for B and A so that $a_i=b_i$ for $i \leq 32$. As a result, A–B can be represented as:

$$\frac{a_0 \, a_1 \ldots a_{31} \, 0 \, a_{33} \ldots a_{55} \, a_{56} \, a_{57} \ldots a_{63}}{\overline{a_0} \, \overline{a_1} \ldots \overline{a_{31}} \, 1 \, \overline{a_{33}} \ldots \overline{a_{55}} \, \overline{b_{56}} \, \overline{b_{57}} \ldots \overline{b_{63}}}$$

with a hot one implicitly forced at bit position 63. Because $\kappa_{56}=0$ and because each bit position $0 \leq i \leq 55$ possesses a single one to be added with a zero and the carry into that bit position, $\delta_i=1$ with $\kappa_i=0$. Thus $\delta_i=1$ for all $0 \leq i \leq 55$.

64 Bit Addressing A−B can be represented for 64 bit addressing for this case as:

$$\frac{0 \, a_1 \ldots a_{55} \, a_{56} \, a_{57} \ldots a_{63}}{1 \, \overline{a_1} \ldots \overline{a_{55}} \, \overline{b_{56}} \, \overline{b_{57}} \ldots \overline{b_{63}}}$$

with a hot one implicitly forced at bit position 63. Because $\kappa_{56}=0$ and because each bit position $0 \leq i \leq 55$ possesses a single one to be added with a zero and the carry into that bit position, $\delta_i=1$ and $\kappa_i=0$. Thus, $\delta_i=1$ for all $0 \leq i \leq 55$.

Theorem 3, Case 5

In this case, B lies in the 256 byte block immediately above the 256 byte block within which A lies. In addition, $B(56:63) \leq E(56:63)$ and $E(56:63) < A(56:63)$. Thus $A(56:63) > B(56:63)$ so that by theorem 1, $\kappa_{56}=1$.

AR24 Bit Mode Since B lies in the 256 byte block immediately above that in which A lies, there exist a position j where $40 \leq j \leq 55$ such that $a_j 0$ and $b_j=1$ with $a_p=1$ and $b_p=0$ for $j<p \leq 55$. In addition, $a_i=b_i$ for $i<j$. As a result, A−B can be represented as:

$$\frac{a_0 \, a_1 \ldots a_{31} \, 0 \, 0 \ldots 0 \, a_{40} \, a_{41} \ldots a_{j-1} \, 0 \, 1 \, 1 \ldots 1 \, a_{56} \, a_{57} \ldots a_{63}}{\overline{a_0} \, \overline{a_1} \ldots \overline{a_{31}} \, 1 \, 1 \ldots 1 \, \overline{a_{40}} \, \overline{a_{41}} \ldots \overline{a_{j-1}} \, 0 \, 1 \, 1 \ldots 1 \, \overline{b_{56}} \, \overline{b_{57}} \ldots \overline{b_{63}}}$$

with a hot one implicitly forced at bit position 63. Because $\kappa_{56}=1$ and because each bit position $j+1 \leq i \leq 55$ possesses two one's that are to be added with the carry into that bit position, $\delta_i=1$ with $\kappa_i=1$ for $j+1 \leq i \leq 55$. At bit position j, both $a_j$ and $b_j$ are zeros with $\kappa_{j+1}=1$. Therefore, $\delta_j=1$ and $\kappa_j=0$. At each and every bit position between 0 and $j-1$, one and only one of the addends is a one with the carry into that bit position equal to zero. Therefore, $\delta_i=1$ for $0 \leq i \leq j-1$ from which it follows that $\delta_i=1$ for all $0 \leq i \leq 55$.

AR 31 Bit Mode Since B lies in the 256 byte block immediately above that in which A lies, there exist a position j where $33 \leq j \leq 55$ such that $a_j=0$ and $b_j=1$ with $a_p=1$ and $b_p=0$ for $j<p \leq 55$. In addition, $a_i=b_i$ for $i<j$. As a result, A−B can be represented as:

$$\frac{a_0 \, a_1 \ldots a_{31} \, 0 \, a_{33} \ldots a_{j-1} \, 0 \, 1 \, 1 \ldots 1 \, a_{56} \, a_{57} \ldots a_{63}}{\overline{a_0} \, \overline{a_1} \ldots \overline{a_{31}} \, 1 \, \overline{a_{33}} \ldots \overline{a_{j-1}} \, 0 \, 1 \, 1 \ldots 1 \, \overline{b_{56}} \, \overline{b_{57}} \ldots \overline{b_{63}}}$$

with a hot one implicitly forced at bit position 63. Because $\kappa_{56}=1$ and because each bit position $j+1 \leq i \leq 55$ possesses two one's that are to be added with the carry into that bit position, $\delta_i=1$ and $\kappa_i=1$ for all $j+1 \leq i \leq 55$. At bit position j, both $a_j$ and $b_j$ are zeros with the $\kappa_{j+1}=1$. Therefore, $\delta_j=1$ and $\kappa_j=0$. At each and every bit position between 0 and $j-1$, one and only one of the addends is a one with the carry into that bit position equal to zero. Therefore, $\delta_i=1$ for $0 \leq i \leq j-1$ from which it follows that $\delta_i=1$ for all $0 \leq i \leq 55$.

64 Bit Addressing Since B lies in the 256 byte block immediately above that in which A lies, there exist a position j where $1 \leq j \leq 55$ such that $a_j=0$ and $b_j=1$ with $a_p=1$ and $b_p=0$ for $j<p \leq 55$. In addition, $a_i=b_i$ for $i<j$. As a result, A−B can be represented as:

$$\frac{0 \, a_1 \ldots a_{j-1} \, 0 \, 1 \, 1 \ldots 1 \, a_{56} \, a_{57} \ldots a_{63}}{1 \, \overline{a_1} \ldots \overline{a_{j-1}} \, 0 \, 1 \, 1 \ldots 1 \, \overline{b_{56}} \, \overline{b_{57}} \ldots \overline{b_{63}}}$$

with a hot one implicitly forced at bit position 63. Because $\kappa_{56}=1$ and because each bit position $j+1 \leq i \leq 55$ possesses two one's that are to be added with the carry into that bit position, $\delta_i=1$ with $\kappa_i=1$ for all $j+1 \leq i \leq 55$. At bit position j, both $a_j$ and $b_j$ are zeros with $\kappa_{j+1}=1$. Therefore, $\delta_j=1$ and $\kappa_j=0$. At each and every bit position between 0 and $j-1$, one and only one of the addends is a one with the carry into that bit position equal to zero. Therefore, $\delta_i=1$ for $0 \leq i \leq j-1$ from which it follows that $\delta_i=1$ for all $0 \leq i \leq 55$.

QED

Theorem 4

If storage operands 1 and 2 do not possess MVC type overlap and SAR1 is mapped above SAR2 when SAR2 is within the high 256 byte block and SAR1 is within the low 256 byte block of the address space, then $\delta_i$, the result of the subtraction, SAR2−SAR1, will not be all ones for $0 \leq i \leq 55$ except for nonoverlap cases 1, 6, and 11 when a carry is produced from bit 56 into bit 55 ($\kappa_{56}=1$), and nonoverlap case 3.

Theorem 4, Case 1

Case 1 is characterized by A lying within the high 256 byte block of the address space and B lying within the low 256 byte block with the most significant bits of A equal to those of B. Because A lies within the high 256 byte block and B lies within the low order 256 byte block within the address space, B must be mapped above A. In addition, $A(56:63)$ may be less than $B(56:63)$ in which case by theorem 2 $\kappa_{56}=0$ (subcase 1), or $A(56:63)$ may be greater than or equal to $B(56:63)$ in which case by theorem 1 $\kappa_{56}=1$ (subcase 2). Both of these subcases must be considered for all three addressing modes.

AR 24 Bit Mode For this addressing mode, mapping B above A consists of forcing bit 39 to a logic 1. Because bit positions more significant than 39 are equal, $a_i=b_i$ for $i \leq 38$. As a result, A−B can be represented as:

$$\frac{a_0 \, a_1 \ldots a_{31} \, 0 \, 0 \ldots 0 \, 1 \, 1 \ldots 1 \, a_{56} \, a_{57} \ldots a_{63}}{\overline{a_0} \, \overline{a_1} \ldots \overline{a_{31}} \, 1 \, 1 \ldots 0 \, 1 \, 1 \ldots 1 \, \overline{b_{56}} \, \overline{b_{57}} \ldots \overline{b_{63}}}$$

with a hot one implicitly forced at bit position 63.

Subcase 1 Consider bit position 55. Because bit position 55 possesses two ones to be added with $\kappa_{56}$ which is zero, $\delta_{55}=0$. Therefore, for this subcase, $\delta_i$ is not all one's for $0 \leq i \leq 55$.

Subcase 2 Because $\kappa_{56}=1$ and because each bit position $40 \leq i \leq 55$ possesses two ones to be added with the carry into that position, $\delta_i=1$ and $\kappa_i=1$ for all $40 \leq i \leq 55$. At bit position 39, two zero's are to be added with $\kappa_{40}$ which is 1. Therefore, $\delta_{39}=1$ and $\kappa_{39}=0$. For each bit position $0 \leq i \leq 38$ a zero is added to a one and the carry into that bit position. Since $\kappa_{39}=0$, then $\delta_i=1$ for all $0 \leq i \leq 38$ from which it follows that $\delta_i=1$ for all $0 \leq i \leq 55$.

AR 31 Bit Mode For this addressing mode, mapping B above A consists of forcing bit 32 to a logic 1. Because bit positions more significant than 32 are equal, $a_i=b_i$ for $i \leq 31$. As a result, A−B can be represented as:

$$\frac{a_0 \, a_1 \ldots a_{31} \, 0 \, 1 \ldots 1 \, a_{56} \, a_{57} \ldots a_{63}}{\overline{a_0} \, \overline{a_1} \ldots \overline{a_{31}} \, 0 \, 1 \ldots 1 \, \overline{b_{56}} \, \overline{b_{57}} \ldots \overline{b_{63}}}$$

with a hot one implicitly forced at bit position 63.

Subcase 1 Consider bit position 55. Because bit position 55 possesses two ones to be added with $\kappa_{56}$ which is zero, $\delta_{55}=0$. Therefore, for this subcase, $\delta_i$ is not all one's for $0 \leq i \leq 55$.

Subcase 2 Because $\kappa_{56}=1$ and because each bit position $33 \leq i \leq 55$ possesses two ones to be added with the carry into that position, $\delta_i=1$ and $\kappa_i=1$ for all $33 \leq i \leq 55$. At bit position 32, two zero's are to be added with $\kappa_{33}$ which is 1. Therefore, $\delta_{32}=1$ and $\kappa_{32}0$. For each bit position $0 \leq i \leq 31$ a zero is added to a one and the carry into that bit position. Since $\kappa_{32}=0$, then $\delta_i=1$ for all $0 \leq i \leq 31$ from which it follows that $\delta_i=1$ for all $0 \leq i \leq 55$.

64 Bit Addressing Case 1 can not occur for 64 bit addressing. Thus, B does not need to be mapped above A for the 64 bit addressing mode for this case.

Theorem 4, Case 2

Case 2 is characterized by both B and A lying within the highest order 256 byte block in the address space with $A(56:63) \geq B(56:63)$. Thus, by theorem 1, $\kappa_{56}=1$.

AR 24 Bit Mode Bit positions more significant than bit 40 are equal for B and A so that $a_i=b_i$ for $i \leq 39$. As a result, A–B can be represented as:

$$\begin{array}{l} a_0\, a_1 \ldots a_{31}\, 0\, 0 \ldots 0\, 1\, 1 \ldots 1\, a_{56}\, a_{57} \ldots a_{63} \\ \overline{a_0}\, \overline{a_1} \ldots \overline{a_{31}}\, 1\, 1 \ldots 1\, 0\, 0 \ldots 0\, \overline{b_{56}}\, \overline{b_{57}} \ldots \overline{b_{63}} \end{array}$$

with a hot one implicitly forced at bit position 63. Because $\kappa_{56}=1$ and because each bit position $0 \leq i \leq 55$ possesses a single one and a single zero to be added to the carry into that bit position, $\delta_i=0$ and $\kappa_i=1$ for all $0 \leq i \leq 55$. Therefore, $\delta_i \neq 1$ for all $0 \leq i \leq 55$.

AR 31 Bit Mode Bit positions more significant than bit 33 are equivalent for B and A so that $a_i=b_i$ for $i \leq 32$. As a result, A–B can be represented as:

$$\begin{array}{l} a_0\, a_1 \ldots a_{31}\, 0\, 1 \ldots 1\, a_{56}\, a_{57} \ldots a_{63} \\ \overline{a_0}\, \overline{a_1} \ldots \overline{a_{31}}\, 1\, 0 \ldots 0\, \overline{b_{56}}\, \overline{b_{57}} \ldots \overline{b_{63}} \end{array}$$

with a hot one implicitly forced at bit position 63. Because $\delta_i=1$ and because each bit position $0 \leq i \leq 55$ possesses a single one and a single zero to be added with the carry into that bit position, $\delta_i=0$ and $\kappa_i=1$. Therefore, $\delta_i \neq 1$ for all $0 \leq i \leq 55$.

64 Bit Addressing Case 2 can not occur for 64 bit addressing; therefore, it does not need to be addressed.

Theorem 4, Case 3

Case 3 is characterized by B and A lying within identical 256 byte blocks of the address space with $B(56:63) > E(56:63) > A(56:63)$. Thus, $A(56:63) < B(56:63)$ so that by theorem 2, $\kappa_{56}=0$. The 256 byte block is arbitrary.

AR 24 Bit Mode Bit positions more significant than bit 40 are equal so that $a_i=b_i$ for $i \leq 39$. As a result, A–B can be represented as:

$$\begin{array}{l} a_0\, a_1 \ldots a_{31}\, 0\, 0 \ldots 0\, a_{40}\, a_{41} \ldots a_{55}\, a_{56}\, a_{57} \ldots a_{63} \\ \overline{a_0}\, \overline{a_1} \ldots \overline{a_{31}}\, 1\, 1 \ldots 1\, \overline{a_{40}}\, \overline{a_{41}} \ldots \overline{a_{55}}\, \overline{b_{56}}\, \overline{b_{57}} \ldots \overline{b_{63}} \end{array}$$

with a hot one implicitly forced at bit position 63. Because $\kappa_{56}=0$ and because each bit position $0 \leq i \leq 55$ possesses a single one and a single zero to be added with the carry into that bit position, $\delta_i=1$ and $\kappa_i=0$ for each and every bit position. Therefore, $\delta_i=1$ for all $0 \leq i \leq 55$.

AR 31 Bit Mode Bit positions more significant than bit 33 are equal so that $a_i=b_i$ for $i \leq 32$. As a result, A–B can be represented as:

$$\begin{array}{l} a_0\, a_1 \ldots a_{31}\, 0\, a_{33} \ldots a_{55}\, a_{56}\, a_{57} \ldots a_{63} \\ \overline{a_0}\, \overline{a_1} \ldots \overline{a_{31}}\, 1\, \overline{a_{33}} \ldots \overline{a_{55}}\, \overline{b_{56}}\, \overline{b_{57}} \ldots \overline{b_{63}} \end{array}$$

with a hot one implicitly forced at bit position 63. Because $\kappa_{56}=0$ and because each bit position $0 \leq i \leq 55$ possesses a single one and a single zero to be added with the carry into that bit position, $\delta_i=1$ and $\kappa_i=0$ for each and every bit position. Therefore, $\delta_i=1$ for all $0 \leq i \leq 55$.

64 Bit Addressing A–B for the 64 bit addressing mode can be represented as:

$$\begin{array}{l} 0\, a_1 \ldots a_{55}\, a_{56}\, a_{57} \ldots a_{63} \\ 1\, \overline{a_1} \ldots \overline{a_{55}}\, \overline{b_{56}}\, \overline{b_{57}} \ldots \overline{b_{63}} \end{array}$$

with a hot one implicitly forced at bit position 63. Because $\kappa_{56}=0$ and because each bit position $0 \leq i \leq 55$ possesses a single one and a single zero to be added with the carry into that bit position, $\delta_i=1$ and $\kappa_i=0$ for each and every bit position. Therefore, $\delta_i=1$ for all $0 \leq i \leq 55$.

In summary for Case 3, $\delta_i=1$ for all $0 \leq i \leq 55$.

Theorem 4, Cases 4 and 5

These cases are characterized by B and A lying within identical 256 byte blocks of the address space with $A(56:63) \geq B(56:63)$. Thus by theorem 1, $\kappa_{56}=1$. The 256 byte block is arbitrary.

AR 24 Bit Mode Bit positions more significant than bit 40 are equal so that $a_i=b_i$ for $i \leq 39$. As a result, A–B can be represented as:

$$\begin{array}{l} a_0\, a_1 \ldots a_{31}\, 0\, 0 \ldots 0\, a_{40}\, a_{41} \ldots a_{55}\, a_{56}\, a_{57} \ldots a_{63} \\ \overline{a_0}\, \overline{a_1} \ldots \overline{a_{31}}\, 1\, 1 \ldots 1\, \overline{a_{40}}\, \overline{a_{41}} \ldots \overline{a_{55}}\, \overline{b_{56}}\, \overline{b_{57}} \ldots \overline{b_{63}} \end{array}$$

with a hot one implicitly forced at bit position 63. Because $\kappa_{56}=1$ and because each bit position $0 \leq i \leq 55$ possesses a single one and a single zero to be added with the carry into that bit position, $\delta_i=0$ and $\kappa_i=1$ for each and every bit position. Therefore, $\delta_i \neq 1$ for all $0 \leq i \leq 55$.

AR 31 Bit Mode Bit positions more significant than bit 33 are equal so that $a_i=b_i$ for $i \leq 32$. As a result, A–B can be represented as:

$$\begin{array}{l} a_0\, a_1 \ldots a_{31}\, 0\, a_{33} \ldots a_{55}\, a_{56}\, a_{57} \ldots a_{63} \\ \overline{a_0}\, \overline{a_1} \ldots \overline{a_{31}}\, 1\, \overline{a_{33}} \ldots \overline{a_{55}}\, \overline{b_{56}}\, \overline{b_{57}} \ldots \overline{b_{63}} \end{array}$$

with a hot one implicitly forced at bit position 63. Because $\kappa_{56}=1$ and because each bit position $0 \leq i \leq 55$ possesses a single one and a single zero to be added with the carry into that bit position, $\delta_i=0$ and $\kappa_i=1$ for each and every bit position. Therefore, $\delta_i \neq 1$ is for all $0 \leq i \leq 55$.

64 Bit Addressing A–B for 64 bit addressing mode can be represented as:

$$\begin{array}{l} 0\, a_1 \ldots a_{55}\, a_{56}\, a_{57} \ldots a_{63} \\ 1\, \overline{a_1} \ldots \overline{a_{55}}\, \overline{b_{56}}\, \overline{b_{57}} \ldots \overline{b_{63}} \end{array}$$

a hot one implicitly forced at bit position 63. Because $\kappa_{56}=1$ and because each bit position $0 \leq i \leq 55$ possesses a single one and a single zero to be added with the carry into that bit position, $\delta_i 0$ and $\kappa_i=1$ for each and every bit position. Therefore, $\delta_i \neq 1$ for all $0 \leq i \leq 55$.

In summary for Cases 4 and 5, $\delta_i \neq 1$ for all $0 \leq i \leq 55$.

Theorem 4, Cases 6 and 11

For these cases, B lies in the 256 byte block immediately above the 256 byte block within which A lies. Also $A(56:63)$ may be either less than $B(56:63)$ in which case from theorem 2 $\kappa_{56}=0$ (subcase 1), or A(56:63) may be greater than or equal to B(56:63)in which case from theorem 1 $\kappa_{56}=1$ (subcase 2). Both subcases must be considered for each of the three addressing modes.

AR 24 Bit Mode Since B lies in the 256 byte block immediately above that in which A lies, there exist a position j where $40 \leq j \leq 55$ such that $a_j=0$ and $b_j=1$ with $a_p=1$ and $b_p=0$ for $j<p \leq 55$. In addition, $a_i=b_i$ for $i<j$. As a result, A–B can be represented as:

$$\frac{a_0\, a_1 \ldots a_{31}\, 0\, 0 \ldots 0\, a_{40}\, a_{41} \ldots a_{j-1}\, 0\, 1\, 1 \ldots 1\, a_{56}\, a_{57} \ldots a_{63}}{\overline{a_0}\, \overline{a_1} \ldots \overline{a_{31}}\, 1\, 1 \ldots 1\, \overline{a_{40}}\, \overline{a_{41}} \ldots \overline{a_{j-1}}\, 0\, 1\, 1 \ldots 1\, \overline{b_{56}}\, \overline{b_{57}} \ldots \overline{b_{63}}}$$

with a hot one implicitly forced at bit position 63.

Subcase 1 Consider bit position 55. At this position, two one's are to be added with $\kappa_{56}$ which is zero. As a result, $\delta_{55}=0$ so that $\delta_i \neq 1$ for all $0 \leq i \leq 55$.

Subcase 2 Because $\kappa_{56}=1$ and because each bit position $(j+1) \leq i \leq 55$ possesses two one's that are to be added with the carry into that bit position, $\delta_i=1$ and $\kappa_i=1$ for all $(j+1) \leq i \leq 55$. At bit position j, two zero's are to be added to $\kappa_{j+1}=1$ so that $\delta_j=1$ and $\kappa_j=0$. At each and every bit position between 0 and j–1, a one and a zero are to be added with the carry into that bit position. Since $\kappa_j=0$, $\delta_i=1$ and $\kappa_i=0$ for all $0 \leq i \leq (j-1)$. Therefore, $\delta_i=1$ for $0 \leq i \leq 55$.

AR 31 Bit Addressing Since B lies in the 256 byte block immediately above that in which A lies, there exist a j where $33 \leq j \leq 55$ such that $a_j=0$ and $b_j=1$ with $a_p=1$ and $b_p=0$ for $j<p \leq 55$. In addition, $a_i=b_i$ for $i<j$. As a result, A–B can be represented as:

$$\frac{a_0\, a_1 \ldots a_{31}\, 0\, a_{33} \ldots a_{j-1}\, 0\, 1\, 1 \ldots 1\, a_{56}\, a_{57} \ldots a_{63}}{\overline{a_0}\, \overline{a_1} \ldots \overline{a_{31}}\, 1\, \overline{a_{33}} \ldots \overline{a_{j-1}}\, 0\, 1\, 1 \ldots 1\, \overline{b_{56}}\, \overline{b_{57}} \ldots \overline{b_{63}}}$$

with a hot one implicitly forced at bit position 63.

Subcase 1 Consider bit position 55. At this position, two one's are to be added with $\kappa_{56}$ which is zero. As a result, $\delta_{55}=0$ so that $\delta_i \neq 1$ for all $0 \leq i \leq 55$.

Subcase 2 Because $\kappa_{56}=1$ and because each bit position $(j+1) \leq i \leq 55$ possesses two one's that are to be added with the carry into that bit position, $\delta_i=1$ and $\kappa_i=1$ for all $(j+1) \leq i \leq 55$. At bit position j, two zero's are to be added to $\kappa_{j+1}=1$ so that $\delta_j=1$ and $\kappa_j=0$. At each and every bit position between 0 and j–1, a one and a zero are to be added with the carry into that bit position. Since $\kappa_j=0$, $\delta_i=1$, and $\kappa_i=0$ for all $0 \leq i \leq (j-1)$. Therefore, $\delta_i=1$ for $0 \leq i \leq 55$.

64 Bit Addressing Since B lies in the 256 byte block immediately above that in which A lies, then there exist a j where $0 \leq j \leq 55$ such that $a_j=0$ and $b_j=1$ with $a_p=1$ and $b_p=0$ for $j \leq p \leq 55$. In addition, $a_i=b_i$ for $i<j$. As a result, A–B can be represented as:

$$\frac{0\, a_1 \ldots a_{j-1}\, 0\, 1\, 1 \ldots 1\, a_{56}\, a_{57} \ldots a_{63}}{1\, \overline{a_1} \ldots \overline{a_{j-1}}\, 0\, 1\, 1 \ldots 1\, \overline{b_{56}}\, \overline{b_{57}} \ldots \overline{b_{63}}}$$

with a hot one implicitly forced at bit position 63.

Subcase 1 Consider bit position 55. At this position, two one's are to be added with $\kappa_{56}$ which is zero. As a result, $\delta_{55}=0$ so that $\delta_i \neq 1$ for all $0 \leq i \leq 55$.

Subcase 2 Because $\kappa_{56}=1$ and because each bit position $(j+1) \leq i \leq 55$ possesses two one's that are to be added with the carry into that bit position, $\delta_i=1$ and $\kappa_i=1$ for all $(j+1) \leq i \leq 55$. At bit position j, two zero's are to be added to $\kappa_{j+1}=1$ so that $\delta_j=1$ and $\kappa_j=0$. At each and every bit position between 0 and j–1, a one and a zero are to be added with the carry into that bit position. Since $\kappa_j=0$, $\delta_i=1$, and $\kappa_i=0$ for all $0 \leq i \leq j-1$. Therefore, $\delta_i=1$ for $0 \leq i \leq 55$.

In summary for Cases 6 and 11, $\delta_i \neq 1$ for all $0 \leq i \leq 55$ if $\kappa_{56}=0$. If $\kappa_{56}=1$ then $\delta_i=1$ for all $0 \leq i \leq 55$.

Theorem 4, Case 7

In this case, A lies in the 256 byte block immediately above the 256 byte block within which B lies. Though A(56:63) may be either less than B(56:63) in which case from theorem 2 $\kappa_{56}=0$ (subcase 1), or A(56:63) may be greater than or equal to B(56:63)in which case from theorem 1 $\kappa_{56}=1$ (subcase 2), the two subcases can be considered simultaneously for each of the addressing modes.

AR 24 Bit Mode Since A lies in the 256 byte block immediately above that in which B lies, there exist a position j where $40 \leq j \leq 55$ such that $a_j=1$ and $b_j=0$ with $a_p=0$ and $b_p=1$ for $j<p \leq 55$. In addition, $a_i=b_i$ for $i<j$. As a result, A–B can be represented as:

$$\frac{a_0\, a_1 \ldots a_{31}\, 0\, 0 \ldots 0\, a_{40}\, a_{41} \ldots a_{j-1}\, 1\, 0\, 0 \ldots 0\, a_{56}\, a_{57} \ldots a_{63}}{\overline{a_0}\, \overline{a_1} \ldots \overline{a_{31}}\, 1\, 1 \ldots 1\, \overline{a_{40}}\, \overline{a_{41}} \ldots \overline{a_{j-1}}\, 1\, 0\, 0 \ldots 0\, \overline{b_{56}}\, \overline{b_{57}} \ldots \overline{b_{63}}}$$

with a hot one implicitly forced at bit position 63. Consider bit position j. At this position, two ones are to be added with the carry into that bit position. As a result, $\kappa_j=1$ despite whether $\kappa_{j+1}=0$ or $\kappa_{j+1}=1$. At bit position j–1 a one and a zero are to be added with $\kappa_j$. Therefore, since $\kappa_j=1$, $\delta_{j-1}=0$ from which it follows that $\delta_i \neq 1$ for all $0 \leq i \leq 55$.

Access Register with 31 Bit Addressing Since A lies in the 256 byte block immediately above that in which B lies, there exist a position j where $33 \leq j \leq 55$ such that $a_j=1$ and $b_j=0$ with $a_p=0$ and $b_p=1$ for $j<p \leq 55$. In addition, $a_i=b_i$ for $i<j$. As a result, A–B can be represented as:

$$\frac{a_0\, a_1 \ldots a_{31}\, 0\, a_{33} \ldots a_{j-1}\, 1\, 0\, 0 \ldots 0\, a_{56}\, a_{57} \ldots a_{63}}{\overline{a_0}\, \overline{a_1} \ldots \overline{a_{31}}\, 1\, \overline{a_{33}} \ldots \overline{a_{j-1}}\, 1\, 0\, 0 \ldots 0\, \overline{b_{56}}\, \overline{b_{57}} \ldots \overline{b_{63}}}$$

with a hot one implicitly forced at bit position 63. Consider bit position j. At this position, two ones are to be added with the carry into that bit position. As a result, $\kappa_j=1$ despite whether $\kappa_{j+1}=0$ or $\kappa_{j+1}=1$. At bit position j–1 a one and a zero are to be added with $\kappa_j$. Therefore, since $\kappa_j=1$, $\delta_{j-1}=0$ from which it follows that $\delta_i \neq 1$ for all $0 \leq i \leq 55$.

64 Bit Addressing Since A lies in the 256 byte block immediately above that in which B lies, there exist a position j where $1 \leq j \leq 55$ such that $a_j=1$ and $b_j=0$ with $a_p 0$ and $b_p=1$ for $j<p \leq 55$. In addition, $a_i=b_i$ for $i<j$. As a result, A–B can be represented as:

$$\frac{0\, a_1 \ldots a_{j-1}\, 1\, 0\, 0 \ldots 0\, a_{56}\, a_{57} \ldots a_{63}}{1\, \overline{a_1} \ldots \overline{a_{j-1}}\, 1\, 0\, 0 \ldots 0\, \overline{b_{56}}\, \overline{b_{57}} \ldots \overline{b_{63}}}$$

with a hot one implicitly forced at bit position 63. Consider bit position j. At this position, two ones are to be added with the carry into that bit position.

As a result, $\kappa_j=1$ despite whether $\kappa_{j+1}=0$ or $\kappa_{j+1}=1$. At bit position j–1 a one and a zero are to be added with $\kappa_j$. Therefore, since $\kappa_j=1$, $\delta_{j-1}=0$ from which it follows that $\delta_i \neq 1$ for all $0 \leq i \leq 55$.

In summary for Case 7, $\delta_i \neq 1$ for all $0 \leq i \leq 55$.

Theorem 4, Cases 8, 9, 10, and 12

For these cases, A and B lie in 256 byte blocks that are separated by at least one 256 byte block. All address modes can be treated the same for these cases. For this cases, there exist at least one bit position j between 1 and 55 where $a_j \neq b_j$ and $a_i=b_i$ for all $i<j$.

First consider bit position j when $a_j=\overline{b_j}=1$. For this condition, $\kappa_j=1$ despite whether $\kappa_{j+1}=0$ or $\kappa_{j+1}=1$. At position j–1 a one and a zero are added to $\kappa_j$ producing $\delta_{j-1}=0$ from which it follows that $\delta_i \neq 1$ for all $0 \leq i \leq 55$.

Next consider the condition that $a_j=\overline{b_j}=0$ with $\kappa_{j+1}0$. The result of the addition of $a_j$, $\overline{b_j}$ and $\kappa_{j+1}$ is $\delta_j=0$ from which it also follows that $\delta_i \neq 1$ for all $0 \leq i \leq 55$.

Finally consider the case that $a_j=\overline{b_j}=0$ with $\kappa_{j+1}=1$. In this case, $\delta_j=1$ and $\kappa_j=0$. Since $\overline{b_i}=a_i$ for $i<j$, and $\kappa_j=0$, then $\delta_i=1$ and $\kappa_i=0$ for all $0 \leq i<j$. For $\kappa_{j+1}=1$, however, either both addends at j+1 are one and $\kappa_{j+2}=0$ (subcase 1), one of the addends is a one while the other is a zero and $\kappa_{j+2}=1$ (subcase 2), or both addends are one and $\kappa_{j+2}=1$. For subcases 1 and 2, $\delta_{j+1}=0$ from which it follows that $\delta_i \neq 1$ for all $0 \leq i \leq 55$. For subcase 3 $\delta_{j+1}=1$, however, since $\kappa_{j+2}=1$ the identical three subcases arise at bit position j+2. Therefore, for $\delta_{j+2}=1$, both addends at j+2 must be one with $\kappa_{j+3}=1$, or $\delta_{j+2}=0$ from which it follows that $\delta_i \neq 1$ for all $0 \leq i \leq 55$. Such an argument continues bitwise for $(j+1) \leq p \leq 55$ so that for $\delta_p=1$ for all $(j+1) \leq p \leq 55$, it follows that $a_p=\overline{b_p}=1$. Therefore, $a_p=1$ while $b_p=0$ from which it follows that B must lie within the 256 byte block immediately above the 256 byte block within which A resides for $\delta_i=1$ for all $0 \leq i \leq 55$. But this conflicts with the assumption for these cases that B and A are separated by one or more 256 byte blocks. As a result, $\delta_i \neq 1$ for all $0 \leq i \leq 55$ In summary for Cases 8, 9, 10, and 12, $\delta_i \neq 1$ for all $0 \leq i \leq 55$.

From the considerations of each of the 12 cases, it can be seen that if storage operands 1 and 2 do not contain MVC type overlap, then $\delta_i \neq 1$ for all $0 \leq i \leq 55$ except for nonoverlap Cases 1, 6, and 11 when $\kappa_{56}=1$ and for nonoverlap Case 3.

QED

Theorem 5

If $\delta_i$, the result of the subtraction SAR2–SAR1, is a logic 1 for all $0 \leq i \leq 55$, then $c_{56}$, the carry produced from bit position 56 into bit position 55 during the addition (SAR2–SAR1)+L is a one iff the storage operands contain a MVC type overlap.

Proof:

Proof of if

By the Commutative property of addition, SAR2(55:63)–SAR1(55:63)+L(55:63) can be produced by either $\Delta$(55:63)+L(55:63) or E(55:63)–B(55:63). As a result, $$S_{55}S_{55}^\dagger$$

But $$S_{55}=\delta_{55}\lor L_{55}\lor c_{56}$$

which since $L_{55}=0$ becomes $$S_{55}\delta_{55}\lor c_{56}$$

Since, $$\delta_{55}=a_{55}\lor\overline{b_{55}}\lor\kappa_{56}$$

then $$S_{55}=a_{55}\lor\overline{b_{55}}\lor\kappa_{56}\lor c_{56}$$

Similarly, $$S_{55}^\dagger=\epsilon_{55}\lor\overline{b_{55}}\lor\lambda_{56}$$

which since $$\epsilon_{55}=a_{55}\lor L_{55}\lor\lambda_{56}=a_{55}\lor\lambda_{56}$$

becomes $$S_{55}^\dagger=a_{55}\lor\gamma_{56}\lor\overline{b_{55}}\lor\lambda_{56}=a_{55}\lor\overline{b_{55}}\lor\gamma_{56}\lor\lambda_{56}$$

Since $S_{55}=S_{55}^\dagger$ then $$a_{55}\lor\overline{b_{55}}\lor\kappa_{56}\lor c_{56}=a_{55}\lor\overline{b_{55}}\lor\gamma_{56}\lor\lambda_{56}$$

and $$\kappa_{56}\lor c_{56}=\gamma_{56}\lor\lambda_{56}$$

Each of the five MVC type overlap cases must now be considered.

Theorem 5, overlap Cases 1 and 5

For cases 1 and 5, $E(56:63) \geq B(56:63)$. By Theorem 1, $\lambda_{56}=1$. In addition, $A(56:63)>B(56:63)$ so that by Theorem 1 $\kappa_{56}=1$. Finally, $A(56:63)+L(56:63)$ falls into the next sequential 256 byte of the address space so that the carry, $\gamma_{56}$, is also a one. Substituting these into:

$$\kappa_{56}\lor c_{56}=\gamma_{56}\lor\lambda_{56}$$

gives:

$$1\lor c_{56}=1\lor 1$$

$$\overline{c_{56}}=0$$

$$c_{56}=1$$

Theorem 5, overlap Cases 2 and 4

For cases 2 and 4, $A(56:63)<B(56:63)$ and $E(56:63)<B(56:63)$. By Theorem 2, $\kappa_{56}=0$ and $\lambda_{56}=0$. As in case 1, $A(56:63)+L(56:63)$ crosses a 256 byte boundary so that $\gamma_{56}=1$. From these identities:

$$0\lor c_{56}=1\lor 0$$

$$c_{56}=1$$

Theorem 5, overlap Case 3

For case 3, $A(56:63)<B(56:63)$ and $E(56:63) \geq B(56:63)$. By Theorems 2 and 1, respectively, $\kappa_{56}=0$ and $\lambda_{56}=1$. $A(56:63)+L(56:63)$ does not cross a 256 byte boundary so that $\lambda_{56}=0$. From these identities:

$$0\lor c_{56}=0\lor 1$$

$$c_{56}=1$$

Proof of only if

To prove only if, it must be shown that when $\delta_i=1$ for all $0 \leq i \leq 55$ and the operands do not contain a MVC type overlap, then $c_{56}$ is a zero. From Theorem 4, the cases that must be considered are nonoverlapped case 3 and cases 1, 6, and 11 when $\kappa_{56}=1$.

Theorem 5, nonoverlap Case 3

For this case, $A(56:63)<B(56:63)$ and $E(56:63)<B(56:63)$. From Theorem 2, $\kappa_{56}=0$ and $\lambda_{56}=0$. Since $A(56:63)+L(56:63)$ does not cross a 256 byte boundary, then $\gamma_{56}=0$. Thus, $$0\lor c_{56}=0\lor 0$$

$$c_{56}=0$$

Theorem 5, nonoverlap Cases 1 and 6

For these cases, $\delta_i=1$ for all $0 \leq i \leq 55$ iff $\kappa_{56}=1$. Therefore, only the case when $\kappa_{56}=1$ must be considered. In addition $E(56:63)<B(56:63)$ so that by theorem 2 $\lambda_{56}=0$. Finally, $A(56:63)+L(56:63)$ crosses a 256 byte boundary so that $\gamma_{56}=1$. Substituting these carries into the carry relationship derived above produces:

$$1\lor c_{56}=1\lor 0$$

$\overline{c_{56}}=1$ $c_{56}=0$

Theorem 5, nonoverlap Case 11

For this case, $\delta_i=1$ for all $0 \leq i \leq 55$ iff $\kappa_{56}=1$. From theorem 1, for $\kappa_{56}=1$, then $A(56:63) \geq B(56:63)$. But, $E(56:63) \geq A(56:63)$ from which it follows that $E(56:63) \geq B(56:63)$. From this later result, by theorem 1, $\lambda_{56}=1$. Also, $A(56:63)+L(56:63)$ does not cross a 256 byte boundary so that $\gamma_{56}=0$. Substituting these carries into the carry relationship derived above produces:

$1 \vee c_{56}=0 \vee 1$ $\overline{c_{56}}=1$ $c_{56}=0$

QED

Theorem 6

Storage operands 1 and 2 possess MVC type overlap iff when SAR2 is within the high 256 byte block and SAR1 is within the low 256 byte block of the address space, then SAR1 is mapped above SAR2, and the operation (SAR2–SAR1)+L produces a carry from bit position 56 into position 55 and a result which is all zero's at every bit position i such that $0 \leq i \leq 55$ Proof:

Proof of if

By Theorem 3, if two operands contain MVC overlap and SAR1 is mapped to the 256 byte block immediately succeeding SAR2 if SAR1 lies in the lowest 256 byte block and SAR2 lies in the highest 256 byte block, then SAR2–SAR1 produces all ones at each bit position i such that $0 \leq i \leq 55$. Since L consists of 56 zero's concatenated to the left of OL(0:7) and by Theorem 5 $c_{56}=1$, then each bit i for $0 \leq i \leq 55$ will consist of a one and zero added to a carry of one into the bit. The result will be a zero with a carry produced into the left adjacent bit so that the result is zero for all $0 \leq i \leq 55$.

Proof of only if

Assume that storage operands 1 and 2 do not possess MVC type overlap. Furthermore, assume $S_i=0$ for all $0 \leq i < 55$ and that $c_{56}=1$. But for $S_i=0$ for all $0 \leq i \leq 55$ when $c_{56}=1$, $\delta_i=1$ for all $0 \leq i \leq 55$. By theorem 5, however, $\delta_i=1$ for all $0 \leq i \leq 55$ and $c_{56}=1$ iff the storage operands possess MVC type overlap. Therefore, the assumption that the storage operands are free of MVC type overlap is erroneous.

QED

Theorem 6 provides the conditions to be used to detect MVC type overlap. In summary, the detection of MVC type overlap consists of the following. First, it must be detected that SAR1 lies in the lowest 256 byte block (SAR1LO) when SAR2 lies in the highest 256 byte block (SAR2HI) of the virtual address space. If this case occurs (REMAP1), then SAR1 must be mapped to the 256 byte block immediately above the highest 256 byte block. Otherwise, SAR1 is not to be remapped. With this mapping of SAR1, SAR1 is to be subtracted from SAR2. To this result is added L, the concatenation of 56 zero's with the operand length. If the results of this last addition contains all zero's for all i such that $0 \leq i \leq 55$ and the carry from bit 56 into 55 is a one, then the operands contain MVC type overlap. In the following, the further development of these conditions into a form amenable to hardware prediction of MVC type overlap is pursued.

The address calculation for ESA/390 instructions that can exhibit MVC overlap consist of the addition of a base with a 12 bit displacement. For access register mode using 24 bit addressing, the addition consists of adding the 12 bit displacement to an access register concatenated with eight zero's concatenated with a 24 bit base. For access register mode using 31 bit addressing, the addition consists of adding the 12 bit displacement to an access register concatenated with a zero concatenated, with a 31 bit base. For 64 bit mode, the calculation consists of adding the 12 bit displacement to a 0 concatenated with 63 bits of the base. In the following, $D_2$ and $D_1$ will be used to represent 64 bit numbers consisting of 52 zero's concatenated to the left of the 12 bit displacement, DP(0:11). $D_2$ will be used to represent this form of the displacement for storage operand two while $D_1$ will be used to represent the displacement for storage operand one. The 12 least significant bits of $D_2$ and $D_1$ will be designated as $d_{2i}$ and $d_{1i}$, respectively, where $52 \leq i \leq 63$. In addition, the base for operands one and two will be designated as $B_1$ and $B_2$, respectively, with the individual bits designated as $b_{1i}$ and $b_{2i}$ where $0 \leq i \leq 63$. The base designated in this fashion is understood to include the concatenation of the access register with the actual base for access register mode as described above. Note that B which was previously used to represent SAR1 is now used to represent the base for address calculations.

Using this notation, SAR2 and SAR1 are calculated as:

$SAR2 = B_2 + D_2$ and $SAR1 = B_1 + D_1$

Then (SAR2–SAR1)+L becomes:

$(SAR2-SAR1)+L = (B_2+D_2-B_1-D_1)+L$

For the current discussion, assume that the calculation of neither SAR2 nor SAR1 wraps. In other words, for 24 bit addressing, a carry is not produced from bit 40 into 39, for 31 bit addressing, no carry is produced from bit 33 into 32; for the 64 bit addressing mode, as has already been discussed, wrapping can not occur. This assumption of no wrapping allows the complication of suppressing the carry into these bit positions to be avoided for the current discussion. This complication will be considered later.

Using two's complement arithmetic, the calculation of (SAR2–SAR1)+L can be expressed as:

$(SAR2-SAR1)+L = (B_2+D_2+\overline{B_1}+\overline{D_1}+1+1)+L$ where $\overline{B_1}$, and $\overline{D_1}$ indicate the one's complement of $B_1$ and $D_1$, respectively. The calculation of the results within the parentheses can be reduced to a two-to-one addition as follows:

$b_{20}\ b_{21}\ \ldots\ b_{251}\ b_{252}\ b_{253}\ b_{254}\ b_{255}\ b_{256}\ \ldots\ b_{262}\ b_{263}$
$0\ 0\ \ldots\ 0\ d_{252}\ d_{253}\ d_{254}\ d_{255}\ d_{256}\ \ldots\ d_{262}\ d_{263}$
$\overline{b_{10}}\ \overline{b_{11}}\ \ldots\ \overline{b_{151}}\ \overline{b_{152}}\ \overline{b_{153}}\ \overline{b_{154}}\ \overline{b_{155}}\ \overline{b_{156}}\ \ldots\ \overline{b_{162}}\ \overline{b_{163}}$ $e_0\ e_1\ \ldots\ e_{51}\ e_{52}\ e_{53}\ e_{54}\ e_{55}\ e_{56}\ \ldots\ e_{62}\ e_{63}$
$f_1\ f_2\ \ldots\ f_{52}\ f_{53}\ f_{54}\ f_{55}\ f_{56}\ f_{57}\ \ldots\ f_{63}\ 1$
$1\ 1\ \ldots\ 1\ \overline{d_{152}}\ \overline{d_{153}}\ \overline{d_{154}}\ \overline{d_{155}}\ \overline{d_{156}}\ \ldots\ \overline{d_{162}}\ \overline{d_{163}}$ $g_0\ g_1\ \ldots\ g_{51}\ g_{52}\ g_{53}\ g_{54}\ g_{55}\ g_{56}\ \ldots\ g_{62}\ g_{63}$
$h_1\ h_2\ \ldots\ h_{52}\ h_{53}\ h_{54}\ h_{55}\ h_{56}\ h_{57}\ \ldots\ h_{63}\ 1$ The two-to-one addition of G with individual bits $g_i$ and H with individual bits $h_i$ with H shifted one bit position to the left and the vacancy from the shift filled with a 'hot-one' produces $B_2+D_2-B_1-D_2$.

At this point, the notation used previously needs to be modified to include these latest considerations for determining SAR2–SAR1. Since the two-to-one addition of G and H shifted produces SAR2–SAR1, which was previously denoted as $\Delta$ having individual bits $\delta_i$, the result of the two-to-one addition of G and H shifted will assume this designation. Therefore, $$\begin{array}{c} g_0 \ldots g_{55}\; g_{56} \ldots g_{62}\; g_{63} \\ h_1 \ldots h_{56}\; h_{57} \ldots h_{63}\; 1 \\ \hline \delta_0 \ldots \delta_{55}\; \delta_{56} \ldots \delta_{62}\; \delta_{63} \end{array}$$

Similarly, $\kappa_i$ will assume the meaning of the carry from bit i into i–1 for this two-to-one addition. Furthermore, to be consistent with the previous notation, the result of the two-to-one addition of $\Delta$ with L will be designated as S whose individual bits will be referred to as $S_i$. Thus, $$\begin{array}{c} \delta_0 \ldots \delta_{55}\; \delta_{56} \ldots \delta_{62}\; \delta_{63} \\ L_0 \ldots L_{55}\; L_{56} \ldots L_{62}\; L_{63} \\ \hline S_0 \ldots S_{55}\; S_{56} \ldots S_{62}\; S_{63} \end{array}$$

The carries from bit position i into i–1 for this two-to-one addition will be be designated as $c_i$.

The result S, which is SAR2–SAR1+L can also be calculated as a CSA three-to-two addition of G, H shifted, and L producing a sum having the individual bits, $\sigma_i$, and a carry with individual bits, $\omega_i$, which are added with $\omega$ shifted left one bit position before the addition. Though the result of this two-to-one addition produces SAR2–SAR1+L, it will be denoted as $\Sigma$ having individual bits $\Sigma_i$ to distinguish this calculation from that using two-to-one adders. Therefore, $$\begin{array}{c} g_0 \ldots g_{55}\; g_{56} \ldots g_{62}\; g_{63} \\ h_1 \ldots h_{56}\; h_{57} \ldots h_{63}\; 1 \\ L_0 \ldots L_{55}\; L_{56} \ldots L_{62}\; L_{63} \\ \hline \sigma_0 \ldots \sigma_{55}\; \sigma_{56} \ldots \sigma_{62}\; \sigma_{63} \\ \omega_1 \ldots \omega_{56}\; \omega_{57} \ldots \omega_{63}\; 0 \\ \hline \Sigma_0 \ldots \Sigma_{55}\; \Sigma_{56} \ldots \Sigma_{62}\; \Sigma_{63} \end{array}$$

The carry from i into i–1 for the two-to-one addition of $\sigma_i$ and $\omega_i$ shifted will be designated as $\phi_i$.

By Theorem 6, MVC type overlap exists iff $c_{56}=1$ and $S_i=0$ for all $0 \leq i \leq 55$. Let the prediction that $S_i=0$ for all $0 \leq i \leq 55$ be designated as $S_{=0}$ while MVC type overlap be designated as $O_{MVC}$. Then $$O_{MVC}=c_{56}S_{=0}$$

For $O_{MVC}$ to be a one, $c_{56}$ must be a one so that $S_{=0}$ needs to be determined only for the case that $c_{56}=1$. The determination of $S_{=0}$ when $c_{56}=1$ will be designated as $S_{=0}^\dagger$. The following theorem provides the basis for determining $S_{=0}^\dagger$.

Theorem 7

If $c_{56}=1$, then when $\kappa_{56}=1$, $\phi_{56}=\omega_{56}=1$, and when $\kappa_{56}=0$, either $\phi_{56}=1$ and $\omega_{56}=0$ or $\phi_{56}=0$ and $\omega_{56}=1$.

Proof:

Since by associativity, the addition of three numbers produces the same result despite the order of addition, then $$S_{55}=\Sigma_{55}$$

But $$S_{55}=c_{56}\forall\delta_{55}\forall L_{55}=c_{56}\forall\delta_{55}\forall 0=c_{56}\forall\delta_{55}$$

and $$\Sigma_{55}=\omega_{56}\forall\sigma_{55}\forall\phi_{56}$$

so that $$c_{56}\forall\delta_{55}=\omega_{56}\forall\sigma_{55}\forall\phi_{56}$$

Recognizing that $$\delta_{55}=g_{55}\forall h_{56}\forall\kappa_{56}$$

and $$\sigma_{55}=g_{55}\forall h_{56}\forall L_{55}=g_{55}\forall h_{56}\forall 0=g_{55}\forall h_{56}$$

results in $$c_{56}\forall g_{55}\forall h_{56}\forall\kappa_{56}=\omega_{56}\forall g_{55}\forall h_{56}\forall\phi_{56}$$

$$c_{56}\forall\kappa_{56}=\omega_{56}\forall\phi_{56}$$

With $c_{56}=1$, then $$\overline{\kappa_{56}}=\omega_{56}\forall\phi_{56}$$

If $\kappa_{56}=0$, then $$1=\omega_{56}\forall\phi_{56}$$

This identity is met iff $\omega_{56}=1$ and $\phi_{56}=0$ or $\omega_{56}=0$ and $\phi_{56}=1$. Therefore, when $\kappa_{56}=0$, then either $\omega_{56}=1$ and $\phi_{56}=0$ or $\omega_{56}=0$ and $\phi_{56}=1$.

If $\kappa_{56}=1$, then $$0=\omega_{56}\forall\phi_{56}$$

For $\omega_{56}$ and $\phi_{56}$ to comply with this expression, either $\omega_{56}=\phi_{56}=1$ or $\omega_{56}=\phi_{56}=0$. It is left to show that $\omega_{56}\phi_{56}=1$. The expression for $\kappa_{56}$ is:

$$\kappa_{56}g_{56}h_{57}+g_{56}\kappa_{57}+h_{57}\kappa_{57}$$

First, assume that $\kappa_{57}=0$. In this case, $$\kappa_{56}=g_{56}h_{57}$$

so that for $\kappa_{56}=1$, both $g_{56}=1$ and $h_{57}=1$. Therefore, $\omega_{56}=1$ since $$\omega_{56}=g_{56}h_{57}+L_{56}h_{57}+L_{56}g_{56}$$

Substituting $\omega_{56}=1$, $c_{56}=1$, and $\kappa_{56}=1$ into the relationship of the carries produces:

$$1\forall 1=1\forall\phi_{56}$$

$$0=\overline{\phi_{56}}$$

$$\phi_{56}=1$$

Therefore, when $\kappa_{57}=0$, $\kappa_{56}=1$, and $c_{56}=1$, then $\omega_{56}=1$ and $\phi_{56}=1$.

Next assume that $\kappa_{57}1$. Then $$\kappa_{56}=g_{56}+h_{57}$$

Therefore, for $\kappa_{56}1$ either $g_{56}=1$ or $h_{57}=1$. Furthermore, $$c_{56}=\delta_{56}L_{56}+\delta_{56}c_{57}+L_{56}c_{57}$$

Assume that $c_{57}=1$. Then $$c_{56}=\delta_{56}+L_{56}$$

and since $c_{56}=1$, then either $\delta_{56}=1$ or $L_{56}=1$. First assume that $L_{56}=1$. Then, $$\omega_{56}=g_{56}+h_{57}$$

which since either $g_{56}=1$ or $h_{57}=1$ $$\omega_{56}=1$$

Substituting into the relationship for the carries gives:

$$1 \vee 1 = 1 \vee \phi_{56}$$

$$0 = \overline{\phi_{56}}$$

$$\phi_{56} = 1$$

Now assume that $\delta_{56}=1$. Since $$\delta_{56} = g_{56} \vee h_{57} \vee \kappa_{57}$$

and $\kappa_{57}$ has been assumed to be one, then $$\delta_{56} = \overline{g_{56} \vee h_{57}}$$

$$1 = \overline{g_{56} \vee h_{57}}$$

But since either $g_{56}=1$ or $h_{57}=1$, it follows that both $g_{56}=1$ and $h_{57}=1$. Therefore, since $$\omega_{56} = g_{56}h_{57} + g_{56}L_{56} + h_{57}L_{56}$$

it follows that $\omega_{56}=1$. Substitution into the relationship for the carries produces:

$$1 \vee 1 = 1 \vee \phi_{56}$$

$$0 = \overline{\phi_{56}}$$

$$\phi_{56} = 1$$

Therefore, for $\kappa_{57}=1$, $c_{57}=1$, $\kappa_{56}=1$, and $c_{56}=1$, then $\omega_{56}=1$ and $\phi_{56}=1$. Finally assume that $c_{57}=0$. Then, $$c_{56} = \delta_{56}L_{56} + \delta_{56}c_{57} + L_{56}c_{57}$$

$$c_{56} = \delta_{56}L_{56}$$

so that for $c_{56}=1$, then both $\delta_{56}=1$ and $L_{56}=1$. Since, $$\omega_{56} = g_{56}h_{57} + g_{56}L_{56} + h_{57}L_{56}$$

then $$\omega_{56} = g_{56} + h_{57}$$

But for $\kappa_{57}=1$ as assumed, either $g_{56}=1$ or $h_{57}=1$ from which it follows that $\omega_{56}=1$. Again substituting into the relationship for the carries produces:

$$1 \vee 1 = 1 \vee \phi_{56}$$

$$0 = \overline{\phi_{56}}$$

$$\phi_{56} = 1$$

Therefore, for $\kappa_{57}=1$, $c_{57}=0$, $\kappa_{56}=1$, and $c_{56}=1$, then $\omega_{56}=1$ and $\phi_{56}=1$ from which it follows that if $c_{56}=1$ and $\kappa_{56}=1$ then $\omega_{56}=\phi_{56}=1$.
QED Now, consider the calculation of $\Sigma(0:55)$. $\Sigma$ is calculated by the two-to-one addition of $\sigma$ and $\omega$ shifted left one bit position. This is represented as:

$$\begin{array}{c} \sigma_0 \; \sigma_1 \ldots \sigma_{54} \; \sigma_{55} \\ \omega_1 \; \omega_2 \ldots \omega_{55} \; \omega_{56} \\ \hline \Sigma_0 \; \Sigma_1 \ldots \Sigma_{54} \; \Sigma_{55} \end{array}$$

It must be determined that all $\Sigma_i$ for $0 \leq i \leq 55$ are zero when $c_{56}=1$. To make this determination. Theorem 7 is used to alter the representation of the calculation of $\Sigma$. From theorem 7, when $c_{56}=1$, then both $\phi_{56}$ and $\omega_{56}$ must be one when $\kappa_{56}=1$ and only one of $\phi_{56}$ or $\omega_{56}$ can be one when $\kappa_{56}=0$. Therefore, the addition can be represented as the three-to-one addition:

$$\begin{array}{c} \sigma_0 \; \sigma_1 \ldots \sigma_{54} \; \sigma_{55} \\ \omega_1 \; \omega_2 \ldots \omega_{55} \; \omega_{56} \\ 0 \; 0 \ldots 0_1 \\ \hline \Sigma_0 \; \Sigma_1 \ldots \Sigma_{54} \; \Sigma_{55} \end{array}$$

The advantages of expressing the addition in this fashion result from the theorems to follow. For simplicity of exposition, let $\sigma_i$ be represented by $P_{xi}$ for all $0 \leq i \leq 55$, and $P_{yi}$, $1 \leq i \leq 56$ represent $\omega_i$, $1 \leq i \leq 55$, concatenated with $\kappa_{56}$. The above representation then becomes:

$$\begin{array}{c} P_{x_0} \; P_{x_1} \ldots P_{x_{54}} \; P_{x_{55}} \\ P_{y_1} \; P_{y_2} \ldots P_{y_{55}} \; P_{y_{56}} \\ 0 \; 0 \ldots 0 \; 1 \\ \hline \Sigma_0 \; \Sigma_1 \ldots \Sigma_{54} \; \Sigma_{55}. \end{array}$$

Theorem 8:

If $\Sigma_i=0$, then the carry at position i, $v_i$, generated by the addition of $P_x$, $P_y$, and 1 is equal to 1 for all $0 \leq i \leq 55$.
Proof:
Theorem 8 can be proven by induction.
Base of induction
The expression for the sum at bit position 55 is:

$$\Sigma_{55} = P_{x_{55}} \vee P_{y_{56}} \vee 1$$

$$= \overline{P_{x_{55}} \vee P_{y_{56}}}$$

Assuming that $\Sigma_{55}=0$, then $$\overline{P_{x_{55}} \vee P_{y_{56}}} = 0,$$

therefore, $$P_{x_{55}} \vee P_{y_{56}} = 1.$$

The carry produced at bit position 55, $v_{55}$, is:

$$v_{55} = P_{x_{55}}P_{y_{56}} + P_{x_{55}}(1) + P_{y_{56}}(1)$$

where + represents logical OR. This reduces to:

$$v_{55} = P_{x_{55}} + P_{y_{56}}.$$

Since if $\Sigma_{55}=0$ $$P_{x_{55}} \vee P_{y_{56}} = 1,$$

and since the EXCLUSIVE-OR is one iff one or the other of $P_{x55}$ or $P_{y56}$ is one, but not both, then:

$$P_{x_{55}} + P_{y_{56}} = 1$$

so that, $$v_{55} = 1.$$

Consequently, the carry from bit 55 into bit 54 is guaranteed to be a one if the sum of the addition at bit 55, $\Sigma_{55}$, is equal to zero
Step of induction
Assume that $\Sigma_i=0$ and $v_{i+1}=1$. Since the sum at i, $\Sigma_i$, is $$\Sigma_i = P_{xi} \vee P_{yi+1} \vee v_{i+1},$$

then $$P_{xi} \vee P_{yi+1} \vee 1 = 0,$$

or, $\overline{P_{x_i} \forall P_{y_{i+1}}} = 0$
$P_{x_i} \forall P_{y_{i+1}} = 1$.

The carry at i is:

$v_i = P_{x_i} P_{y_{i+1}} + P_{x_i} v_{i+1} + P_{y_{i+1}} v_{i+1}$.

Since $v_{i+1}=1$, then $v_i = P_{x_i} P_{y_{i+1}} + P_{x_i} + P_{y_{i+1}}$
$= P_{x_i} + P_{y_{i+1}}$.

But from above, $P_{x_i} \forall P_{y_{i+1}} = 1$, from which it follows that $P_{x_i} + P_{y_{i+1}} = 1$, and, $v_i = 1$.

From steps one and two above, it follows by mathematical induction that $v_i=1$ for $0 \leq i \leq 55$.
QED
Theorem 9:
The sum, $\Sigma$, is zero iff $P_{x_i} \forall P_{y_{i+1}} = 1$ for $0 \leq i \leq 55$.
Proof:
Proof of if
If $\Sigma = 0$ then from Theorem 8, $v_{i+1}=1$ for any i from which it follows that:

$P_{x_i} \forall P_{y_{i+1}} = 1$.

since $\Sigma_i$ is zero.
Proof of only if
Consider the carry generated at $v_i$. This carry is:

$v_i = P_{x_i} P_{y_{i+1}} + P_{x_i} v_{i+1} + P_{y_{i+1}} v_{i+1}$
$= P_{x_i} P_{y_{i+1}} + P_{x_i} v_{i+1} (P_{y_{i+1}} + \overline{P_{y_{i+1}}}) + P_{y_{i+1}} v_{i+1} (P_{x_i} + \overline{P_{x_i}})$
$= P_{x_i} P_{y_{i+1}} + P_{x_i} \overline{P_{y_{i+1}}} v_{i+1} + P_{y_{i+1}} \overline{P_{x_i}} v_{i+1}$
$= P_{x_i} P_{y_{i+1}} + (P_{x_i} \forall P_{y_{i+1}}) v_{i+1}$ Since by assumption, $P_{x_i} \forall P_{y_{i+1}} = 1$, then $v_i = v_{i+1}$ Since this must hold for all i and since the carry in is 1, then $v_i = v_{i+1} = \ldots = 1$, Let $\Sigma_i = 1$. But $\Sigma_i$ is:

$\Sigma_i = P_{x_i} \forall P_{y_{i+1}} \forall v_{i+1}$.

However, $P_{x_i} \forall P_{y_{i+1}} = 1$ from which it follows that:

$v_{i+1} = 0$.

Therefore, the assumption that $\Sigma_i = 1$ leads to a contradiction and is therefore erroneous. Thus, $\Sigma_i$ must be zero.

QED

The conditions for $S_{=0}^\dagger$ to be zero follow from Theorems 8 and 9. These conditions are:

$P_{x_i} \forall P_{y_{i+1}} = 1$ for all $0 \leq i \leq 55$. Substituting the appropriate values for $P_{x_i}$, and $P_{y_{i+1}}$ leads to the expression:

$S_{=0}^\dagger = (\sigma_0 \forall \omega_1)(\sigma_1 \forall \omega_2) \ldots (\sigma_{54} \forall \omega_{55})(\sigma_{55} \forall \kappa_{56})$ Once $S_{=0}^\dagger$ is determined, then as already shown, $O_{MVC}$ can be determined by $O_{MVC} = c_{56} S_{=0}^\dagger$ A limited apparatus for predicting MVC type overlap has just been developed. This apparatus is not general since it was assumed that no wrapping occurred during the calculation of the first and second operand addresses. In addition, it was assumed that the second operand address did not point to the highest 256 byte block when the first operand address points to the lowest 256 byte block of the effective address space. Thus, remapping the first operand address to above the second operand address was not required. To predict of MVC type overlap for the general case, these situations must be considered with corrections made to the previous prediction scheme to predict overlap correctly.

The corrections that must be performed to allow the proper prediction of overlap are shown in Table 3 on page 62. The corrections listed in that table are applicable to all three addressing modes. In the table, REMAP1 occurs when SAR2 resides in the highest 256 byte block and SAR1 resides in the lowest 256 byte block of the address space. When this occurs, SAR1 must be remapped to the 256 byte block immediately above the 256 byte block in which SAR2 resides. This can be accomplished by forcing a one at the bit position adjacent to the left MSB of the bits specifying the address space. This bit position is bit 39 for 24 bit addressing, and bit 32 for 31 bit addressing. Remapping is not required for 64 bit addressing for the reasons discussed previously. WRAP1 and WRAP2 are used to indicate that wrapping occurred during the address calculation of SAR1 and SAR2, respectively, in which the base is added to a displacement. WRAP1 and WRAP2 conditions can be identified by detecting that a carry would be produced out of the MSB of the bits specifying the address space when the base is added with the displacement. Therefore, the carry from bit 40 and 33, must be detected to determine that wrapping has occurred for 24 bit, and 31 bit, respectively. Because the address space for 64 bit addressing in $2^{64} - 1$ and the MSB of the 64 bit address must be zero, wrapping can not occur when in the 64 bit addressing mode. When wrapping occurs in the 24 or 31 bit addressing modes, however, the carry produced from the MSB of the address space must be suppressed to allow overlap to be predicted correctly.

From the above discussions, the corrections listed in Table 3 on page 62 must be applied only when in 24 and 31 bit addressing modes. The only difference between the corrections required for these two modes is the bit position at which carries are to be suppressed or forced. For this reason, the following discussion describes the application of the corrections for 24 bit addressing only. Results for 31 bit addressing will be presented without development. As stated above, the carry that must be forced or suppressed for 24 bit addressing is the carry that is produced from bit position 40 into bit position 39 during the addition of B and D. This carry can be forced by adding it's value to the addition B+D. The value of the carry is:

$$0\ 0\ \ldots\ 0\ 1\ 0\ \ldots\ 0\ 0$$

in which the 1 occurs in bit position 39. Similarly, the carry can be suppressed by adding the two's complement of the carry value. Using the value of the carry from above, the two's complement is:

$$\begin{array}{r}1\ 1\ \ldots\ 1\ 0\ 1\ \ldots\ 1\ 1\\ 0\ 0\ \ldots\ 0\ 0\ 0\ \ldots\ 0\ 1\\ \hline 1\ 1\ \ldots\ 1\ 1\ 0\ \ldots\ 0\ 0\end{array}$$

Therefore, the carry can be suppressed by adding (1 1 ... 1 1 0 ... 0 0) to B+D. For predicting MVC type overlap, however, all zeros must be detected for bit positions $0 \leq i \leq 55$ from the arithmetic operation:

$$B_2+D_2-(B_1+D_1)+L$$

To force the carry due to the address calculation of the first operand, the value of the carry must be added to $B_1+D_1$. Since $B_1+D_1$ is subtracted in the expression, however, the two's complement of the carry value must be added to the MVC type overlap calculation to force the carry for the first operand address calculation. Similarly, the carry value must be added to the above expression to suppress the carry from the address calculation for the first operand.

From this discussion, the corrections to be applied for cases one to four of Table 3 on page 62 should be apparent. For the first case, no correction is required. This can be accomplished by adding zero to $B_2+D_2$ and to the result of $B_1+D$. The net affect is to add zero to $B_2+D_2-(B_1+D_1)$. For the second case in which wrapping occurs during the calculation of the first operand, the carry that occurs during $B_1+D_1$ must be suppressed. Therefore, the value of the carry must be added to $B_2+D_2-(B_1+D_1)$ to suppress this carry for the reasons enumerated above. For case 3, wrapping occurs during the address calculation for the second operand. In this case, the carry due to this address calculation is suppressed by adding the two's complement of the carry value to $B_2+D_2-(B_1+D_1)$. Finally, in the fourth case, wrapping due to the address calculation of both operands must be suppressed. The values that must be added to suppress these carries, however, are additive inverses so that the net result is that a value of zero must be added for this correction. The above results are summarized in the first four rows of Table 4 on page 62.

For the remaining four cases of Table 3 on page 62, remapping of SAR1 immediately above the highest 256 byte block of the address space is required. As previously stated, this is accomplished by forcing a one at appropriate bit positions of the result of the address calculation to produce SAR1. This is identical to forcing a carry into that bit position. Thus, for case 5 in which remapping is required while no wrapping occurs during the calculation of either of the operand addresses, the value of the carry must be added to $B_1+D_1$ so that the two's complement of the carry value must be added to $B_2+D_2-(B_1+D_1)$. For case 6, remapping is required while wrapping occurs for the calculation of the first operand. Thus, $B_1+D_1$ produces a carry which automatically remaps SAR1 immediately above the highest 256 byte block of the address space. No correction is required which can be accomplished by adding zero to $B_2+D_2-(B_1+D_1)$. Cases 7 and 8 cannot occur since the addition of a 12 bit displacement to a 24 bit base cannot wrap and produce an address that resides in the highest 256 byte block of the 24 bit address space. Thus, corresponding entries for these cases are not included in Table 4 on page 62. Identical analyses for 31 bit addressing result in Table 5 on page 63. From tables 4, and 5, it can be seen that five unique corrections arise from consideration of all cases for all addressing modes. These unique corrections are summarized in Table 6 on page 63 with the mapping between the unique corrections and the cases within tables 4 and 5 provided by Table 7 on page 64.

The corrections of Table 6 on page 63 must be applied to the calculation of $B_2+D_2-(B_1+D_1)$ to produce a value for SAR2–SAR1 that is consistent with the assumptions that are contained in theorems three to six. Therefore, the correction values must be applied prior to adding the operand storage length to $B_2+D_2-(B_1+D_1)$. This implies that an additional three-to-two CSA stage is needed to add the correction value and obtain two entities whose addition results in SAR2–SAR1 with wrapping removed and remapping forced as required by those theorems. The output of the CSA can then be treated identically as G and H shifted above to detect overlap.

More parallelism, however, can be obtained as follows. First, $B_2+\overline{B_1}+\overline{D_1}$ can be reduced to a sum and a carry by use of a three-to-two adder. If no corrections are to occur, this sum and carry can be added with $D_2$ by means of a second three-to-two CSA producing G and H shifted for use as described earlier. If corrections are required, however, a two-to-one addition between $D_2$ and the correction value can be produced immediately since the addition can be accomplished by concatenating the correction value with $D_2$. For example, correction 3 of Table 6 on page 63, the two-to-one addition of the correction value with $D_2$ is:

$$\begin{array}{r}0\ 0\ \ldots\ 0\ 0\ 0\ \ldots\ d_{252}\ d_{253}\ \ldots\ d_{263}\\ 1\ 1\ \ldots\ 1\ 1\ 0\ \ldots\ 0\ 0\ \ldots\ 0\\ \hline 1\ 1\ \ldots\ 1\ 1\ 0\ \ldots\ d_{252}\ d_{253}\ \ldots\ d_{263}\end{array}$$

This value can then be added to the sum and carry from the three-to-two addition of $B_2+\overline{B_1}-\overline{D_1}$ to generate a corrected G and H which can be treated as in the detection of overlap for the restricted case. Therefore, $$\begin{array}{l}b_{20}\ b_{21}\ \ldots\ b_{251}\ b_{252}\ b_{253}\ b_{254}\ b_{255}\ b_{256}\ \ldots\ b_{262}\ b_{263}\\ \overline{b_{10}}\ \overline{b_{11}}\ \ldots\ \overline{b_{151}}\ \overline{b_{152}}\ \overline{b_{153}}\ \overline{b_{154}}\ \overline{b_{155}}\ \overline{b_{156}}\ \ldots\ \overline{b_{162}}\ \overline{b_{163}}\\ 1\ 1\ \ldots\ 1\ \ \overline{d_{152}}\ \overline{d_{153}}\ \overline{d_{154}}\ \overline{d_{155}}\ \overline{d_{156}}\ \ldots\ \overline{d_{162}}\ \overline{d_{163}}\end{array}$$

$$\begin{array}{l}e_0\ e_1\ \ldots\ e_{51}\ e_{52}\ e_{53}\ e_{54}\ e_{55}\ e_{56}\ \ldots\ e_{62}\ e_{63}\\ f_1\ f_2\ \ldots\ f_{52}\ f_{53}\ f_{54}\ f_{55}\ f_{56}\ f_{57}\ \ldots\ f_{63}\ 1\\ 1\ 1\ \ldots\ 1\ d_{252}\ d_{253}\ d_{254}\ d_{255}\ d_{256}\ \ldots\ d_{262}\ d_{263}\end{array}$$

$$\begin{array}{l}g_0\ g_1\ \ldots\ g_{51}\ g_{52}\ g_{53}\ g_{54}\ g_{55}\ g_{56}\ \ldots\ g_{62}\ g_{63}\\ h_1\ h_2\ \ldots\ h_{52}\ h_{53}\ h_{54}\ h_{55}\ h_{56}\ h_{57}\ \ldots\ h_{63}\ 1\end{array}$$

To extract maximum parallelism, all the potential corrections given in Table 6 on page 63 can be applied to the calculation of $B_2-B_1-D_1+D_2$ through a sequence of two three-to-two CSA's to produce all potential G's and H's whose addition produce the desired value for SAR2–SAR1. Each of these are used as shown previously with the appropriate indicator chosen for use once the case has been determined. Determination of the case is made in parallel with these calculations by appropriate decode of the addressing mode, WRAP1, WRAP2, and REMAP1 in accordance with Table 7 on page 64.

TABLE 3

Requirements for Forcing or Suppressing Carries from MSB of Effective Address Space to Predict MVC Type Operand Overlap

| CASE | REMAP1 | WRAP2 | WRAP1 | ACTION |
|---|---|---|---|---|
| CASE 1 | NO | NO | NO | No corrective action |

TABLE 3-continued

Requirements for Forcing or Suppressing Carries from MSB of Effective Address Space to Predict MVC Type Operand Overlap

| CASE | REMAP1 | WRAP2 | WRAP1 | ACTION |
|---|---|---|---|---|
| CASE 2 | NO | NO | YES | Suppress carry from MSB for $B_1 + D_1$ |
| CASE 3 | NO | YES | NO | Suppress carry from MSB for $B_2 + D_2$ |
| CASE 4 | NO | YES | YES | Suppress carries from MSB for $B_2 + D_2$ and from $B_1 + D_1$ |
| CASE 5 | YES | NO | NO | Force carry from MSB for $B_1 + D_1$ |
| CASE 6 | YES | NO | YES | Allow carry from MSB for $B_1 + D_1$ |
| CASE 7 | YES | YES | NO | Impossible |
| CASE 8 | YES | YES | YES | Impossible |

TABLE 4

Corrections for MVC Type Overlap Detection for 24 Bit Addressing Mode

| CASE | ADD |
|---|---|
| CASE 1 | 0000000000000000000000000000000000000000000000000000000000000000 |
| CASE 2 | 0000000000000000000000000000000000000001000000000000000000000000 |
| CASE 3 | 1111111111111111111111111111111111111110000000000000000000000000 |
| CASE 4 | 0000000000000000000000000000000000000000000000000000000000000000 |
| CASE 5 | 1111111111111111111111111111111111111111000000000000000000000000 |
| CASE 6 | 0000000000000000000000000000000000000000000000000000000000000000 |

TABLE 5

Corrections for MVC Type Overlap Detection for 31 Bit Addressing Mode

| CASE | ADD |
|---|---|
| CASE 1 | 0000000000000000000000000000000000000000000000000000000000000000 |
| CASE 2 | 0000000000000000000000000000000001000000000000000000000000000000 |
| CASE 3 | 1111111111111111111111111111111110000000000000000000000000000000 |
| CASE 4 | 0000000000000000000000000000000000000000000000000000000000000000 |
| CASE 5 | 1111111111111111111111111111111111000000000000000000000000000000 |
| CASE 6 | 0000000000000000000000000000000000000000000000000000000000000000 |

TABLE 6

Unique Corrections Required to Detect MVC Type Overlap

| UNIQUE CASES | ADD |
|---|---|
| COR 1 | 0000000000000000000000000000000000000000000000000000000000000000 |
| COR 2 | 0000000000000000000000000000000000000001000000000000000000000000 |
| COR 3 | 1111111111111111111111111111111111111110000000000000000000000000 |
| COR 4 | 0000000000000000000000000000000001000000000000000000000000000000 |
| COR 5 | 1111111111111111111111111111111110000000000000000000000000000000 |

TABLE 7

Mapping Between Unique Corrections for MVC Type Overlap Detection and Address Calculation Cases

| CORRECTION | MAPPING |
|---|---|
| COR 1 | All addressing modes cases 1, 4, and 6 |
| COR 2 | AR 24 Bit Mode case 2 |
| COR 3 | AR 24 Bit Mode cases 3 and 5 |
| COR 4 | AR 31 Bit Mode case 2 |
| COR 5 | AR 31 Bit Mode cases 3 and 5 |

THE PREFERRED EMBODIMENT

Figure 3:
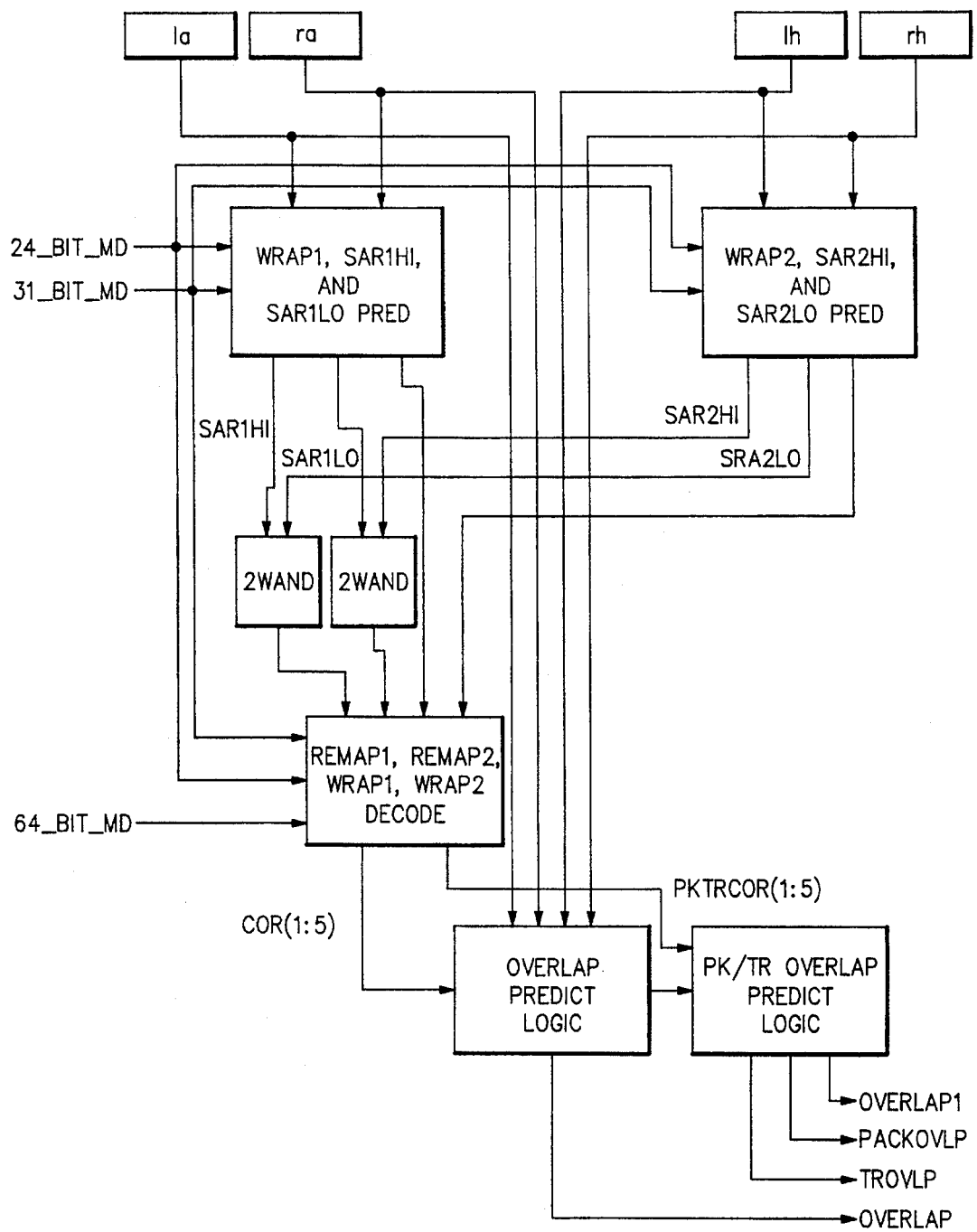
FIG. 3 shows an overview of the hardware required to predict destructive storage operand overlap.
Figure 5:
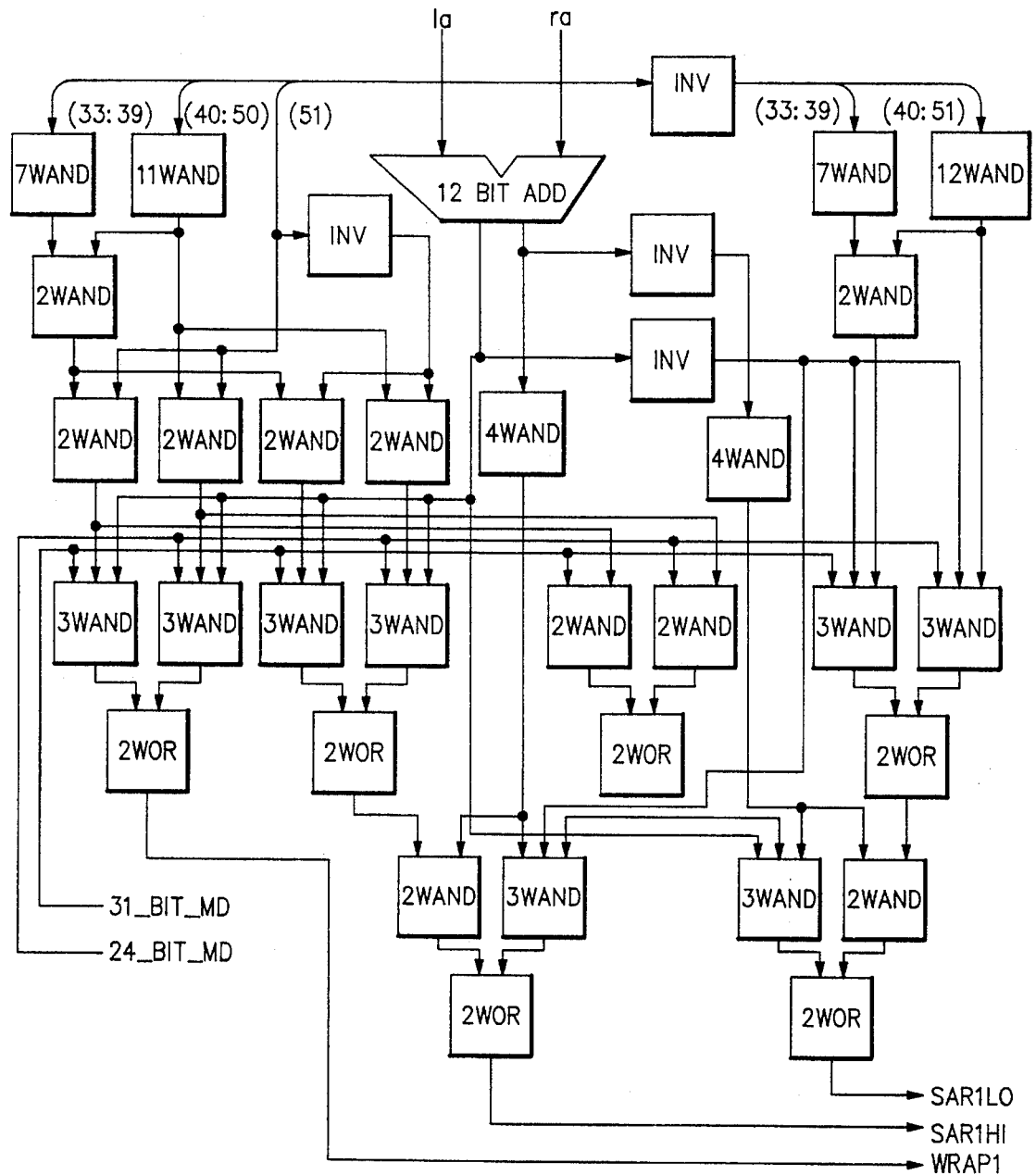
FIG. 5 shows details of logic for determining whether the destination storage operand address resides in the highest 256 byte block of the virtual address space, resides in the lowest 256 byte block of the virtual address space, and the condition that wrapping occurs during the destination storage operand address calculation.
Figure 6:
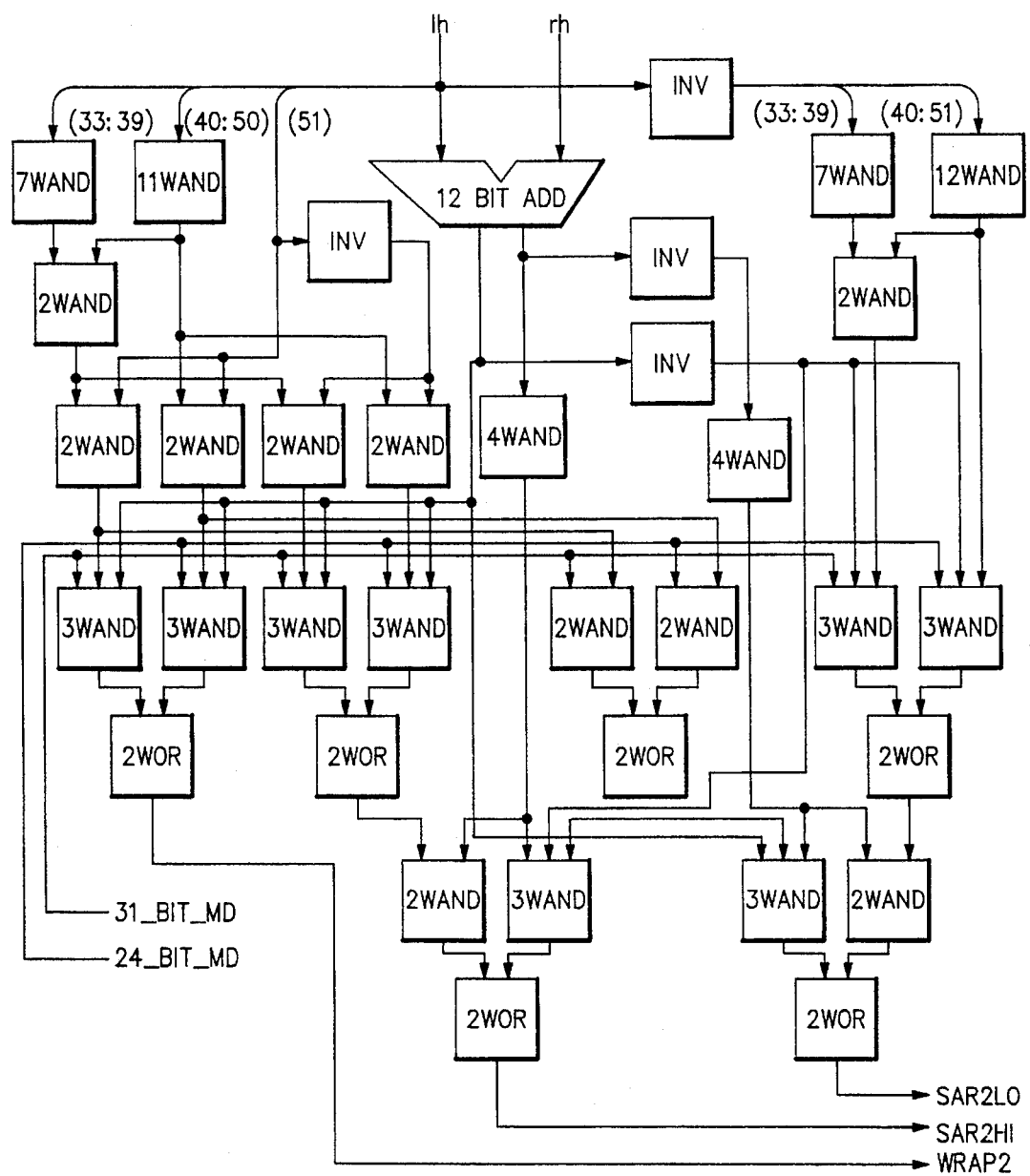
FIG. 6 shows details of logic for determining whether the source storage operand address resides in the highest 256 byte block of the virtual address space, resides in the lowest 256 byte block of the virtual address space, and the condition that wrapping occurs during the source storage operand address calculation.

Turning now to our invention in greater detail, it will be seen that FIG. 3 shows an overview of the hardware used to predict MVC type destructive storage operand overlap. Registers Ih, rh, Ia, and ra contain B2, D2, B1, and D1, respectively, which are the base and displacement values for calculating SAR2 and SAR1. These registers feed blocks whose purpose is to predict the wrap conditions, WRAP2 and WRAP1, as well as to determine whether SAR2 is in the high 256 byte block of the address space (SAR2HI) or SAR1 is in the low 256 byte block of the address space (SAR1LO) as shown in FIG. 5 and FIG. 6. SAR2HI and SAR2LO are ANDED, FIG. 3, to produce REMAP1 (not labeled in FIG.

3) that indicates that remapping is required. REMAP1, WRAP2, and WRAP1 are decoded along with the addressing mode according to Table 6 on page 63 to generate COR(1:5) (REMAP1, REMAP2, WRAP1, WRAP2 DECODE block of FIG. 3) that indicate which overlap correction (designated in the equations to follow as $O_{MVCCOR1}$, $O_{MVCCOR2}$, $O_{MVCCOR3}$, $O_{MVCCOR4}$ and $O_{MVCCOR5}$) should be used to determine overlap. COR(1:5) are fed to the overlap predictor where the actual selection of the appropriate overlap indicator is made. The Overlap Prediction Block implements the algorithms previously discussed. Details of this block are shown in FIG. 4.

Figure 4A:
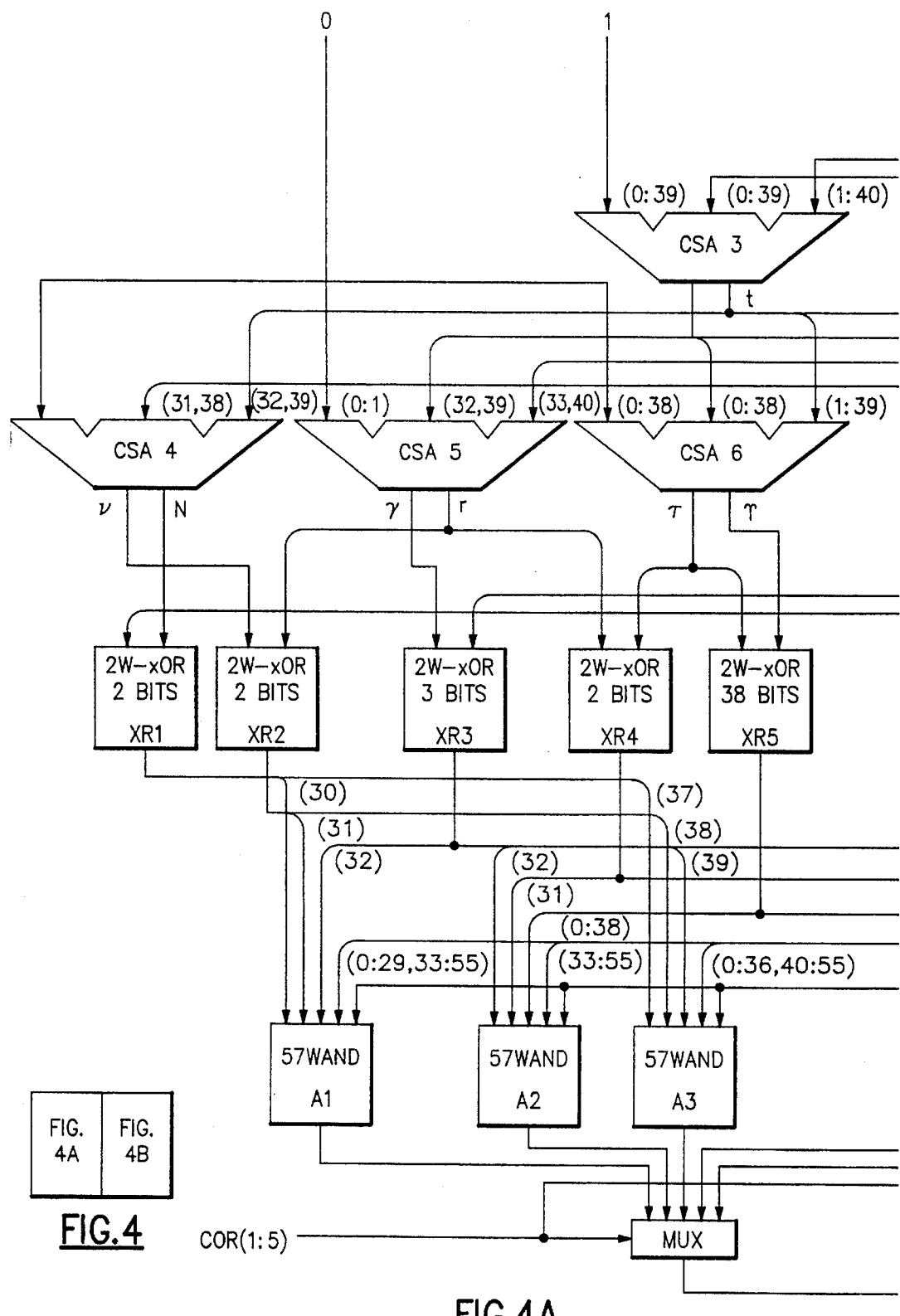
FIG. 4 shows details of the overlap prediction logic block contained within the overview of FIG. 3.
Figure 4B:
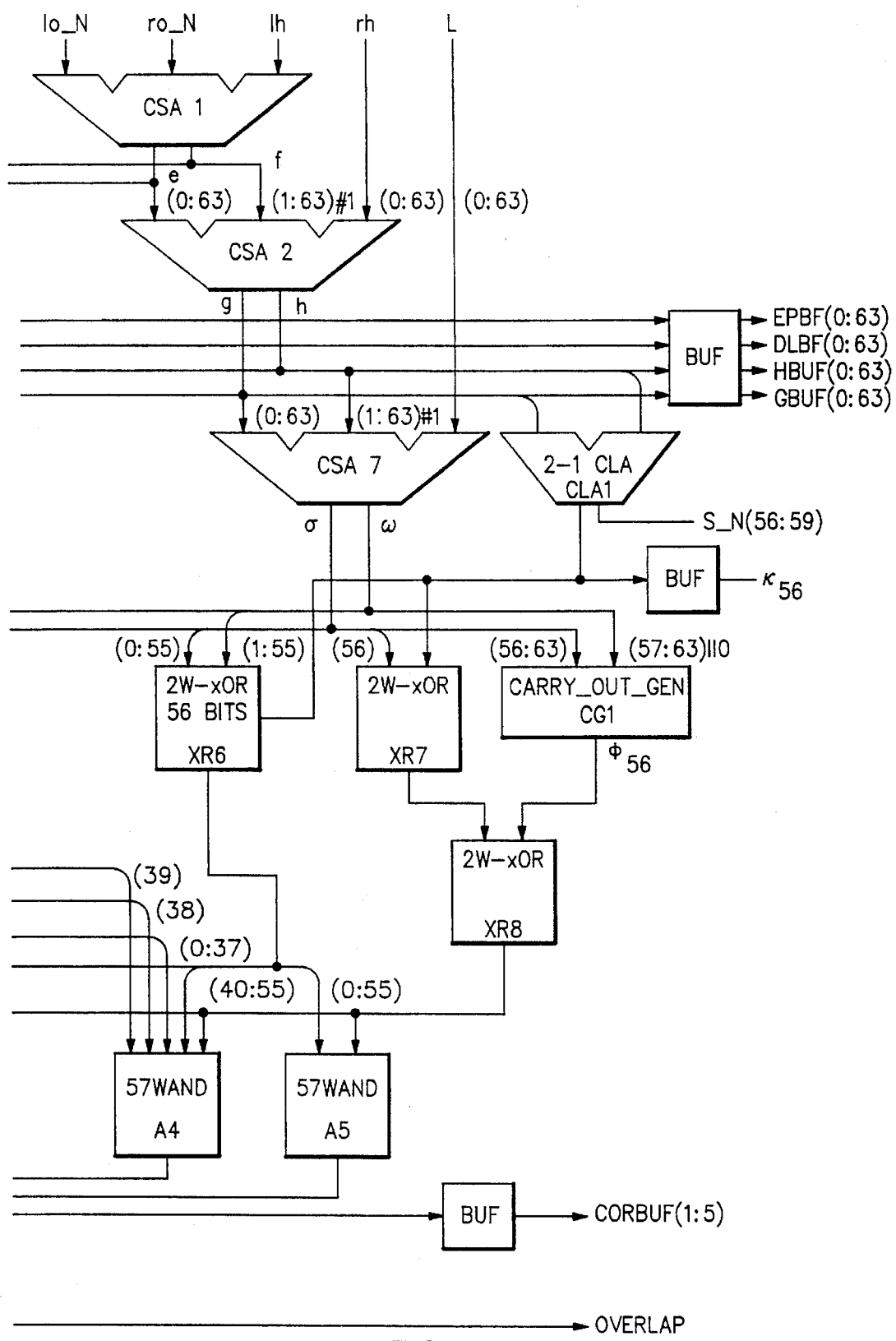

In FIG. 4 a carry save adder, CSA 1, is used to execute the three-to-two addition of $Ih+Ia\_N+ra\_N(B_2+\overline{B_1}+\overline{D_1})$. The sum, E, and carry, F, produced by CSA 1 are fed to two three-to-two adders, CSA 2 and CSA 3 with F shifted left one bit position and the right most bit position supplied with a 'hot one'. In addition to E and F, CSA 2 is fed rh ($D_2$). The results of CSA 2, therefore, are a sum, G, and a carry, H, who if added with H shifted left one bit position and a 'hot one' supplied in the right most position, would produce $B_2+D_2-(B_1+D_1)$. Meanwhile, the left most 40 bit positions of E and F are fed to CSA 3 to be added with 40 one's. This produces values that can be used for correcting the calculation of $B_2+D_2-(B_1+D_1)$ for wrap and remap conditions ($\epsilon$ and $\delta$ of FIG. 4 and the equations to following specifying the behavior of the invention). Rather than being added via a two-to-one adder, G and H from CSA 2 are fed to CSA 7 where L is added to the these values to produce a sum, $\sigma$, and a carry, $\omega$. In parallel, G(56:63) and H(57:63)||0 are fed to a carry generator to produce $\kappa_{56}$ via standard carry lookahead techniques. Meanwhile, CSA's 4, 5, and 6 add selected combinations of the sum of CSA 2 with the carry from CSA 3 to produce the sum $\nu$ and carry N, the sum of CSA 3 with the carry of CSA 2 to produce the sum $\gamma$ and the carry $\Gamma$, and the sum of CSA 3 with its carry to produce the sum $\tau$ and the carry T, respectively, that are required for correcting for wrap and remap conditions.

Various combinations of the sums, $\nu$, $\gamma$, $\tau$, and $\sigma$ and the carries, N, $\Gamma$, T and $\omega$, produced by CSA 4, 5, 6, and 7 along with $\kappa_{56}$ are EXCLUSIVE-ORed in preparation of generating $S_{=0}^\dagger$ for the various correction cases. In parallel, $\sigma(56:63)$ and $\omega(57:63)||0$ are fed to a carry generator to produce $\phi_{56}$ from which $c_{56}$ can be generated by its combination with $\kappa_{56}$ and $\omega_{56}$ according to $$c_{56}=(\omega_{56}\forall\kappa_{56})\forall\phi_{56}$$

This calculation is preformed by a series of 2-way EXCLUSIVE-OR'S as can be seen from FIG. 4. Appropriate outputs of all the EXCLUSIVE-OR's are then fed to 57W-AND's to produce MVC type overlap, $O_{MVC}$, for the six cases summarized in Table 6 on page 63. The appropriate value is selected by COR(1:5), produced by the decoder shown in FIG. 3, to generate the correct MVC type overlap condition designated as OVERLAP in FIG. 4. OVERLAP is then fed to a branch low multiplexer (not shown in FIG. 4) for presentation to the control store next addressing logic for choosing one of two microinstructions for execution on the subsequent cycle. OVERLAP is also latched to make this condition available to subsequent microinstructions later in the instruction cycle. This latch is reset by NEWID bit to be taken from the EIR register, NEWID_EIR, that is setup by the control store logic. The timing for this NEWID signal is:

```
ID | AG | EX |
   mD | AG | EX
               .
               .
               .
         ... mD | AG | EX   (generates Gate_Cnd_EOP early in AG)
              mD | AG | EX   (CEOP -> NEWID valid in AIR)
              ID  | AG | EX  (EIR has NEWID active, use it)
```

NEWID can not become valid at the end of the microcoded exception handler if an exception causes the microcoded exception handler to be invoked in the middle of a microcoded routine. The OVERLAP latch is held if NOT_NEWID_EIR or PIPELINE_HOLD are active; otherwise, a new value is latched. The latching of all overlap BR LO conditions is performed in Control Store. The reader is referred to that workbook for details. The unlatched versions of the overlap conditions are shown in the logic diagrams.

The determination of OVERLAP is fully specified by the following equations. These equations use the following notation $lh_i$  The ith bit of the LH register that contains $B_2$
$la_i$  The ith bit of the LA register that contains $B_1$
$rh_i$  The ith bit of the RH register that contains $D_2$ This is assumed to be a 12 bit register and is so numbered. AGEN occurs by concatenating 56 zero's on the left before using this register as an addend.
$ra_i$  The ith bit of the RA register that contains $D_1$ This is assumed to be a 12 bit register and is so numbered. AGEN occurs by concatenating 56 zero's on the left before using this register as an addend.

The equations are:

CSA1

| | |
|---|---|
| $e_i = lh_i \forall la_i$ | $0 \leq i \leq 51$ |
| $e_i = lh_i \forall la_i \forall ra_{(i-52)}$ | $52 \leq i \leq 63$ |
| $f_i = \overline{lh_i + \overline{la_i}} = \overline{lh_i} \, la_i$ | $1 \leq i \leq 51$ |
| $f_i = lh_i \, \overline{la_i} + lh_i \, \overline{ra_{(i-52)}} + \overline{la_i} \, \overline{ra_{(i-52)}}$ | $52 \leq i \leq 63$ |

CSA2

| | |
|---|---|
| $g_i = e_i \forall f_{i+1}$ | $0 \leq i \leq 51$ |
| $g_i = e_i \forall f_{i+1} \forall rh_{(i-52)}$ | $52 \leq i \leq 62$ |
| $g_{63} = \overline{e_{63} \forall rh_{(11)}}$ | |
| $h_i = e_i f_{i+1}$ | $1 \leq i \leq 51$ |
| $h_i = e_i f_{i+1} + e_i rh_{(i-52)} + f_{i+1} rh_{(i-52)}$ | $52 \leq i \leq 62$ |
| $h_{63} = e_{63} + rh_{(11)}$ | |

CSA3

| | |
|---|---|
| $\delta_i = \overline{g_i}$ | $0 \leq i \leq 39$ |
| $\epsilon\_n_i = \overline{e_i + f_{i+1}}$ | $123\ i \leq 39$ |

CSA7

| | |
|---|---|
| $\sigma_i = g_i \forall h_{i+1}$ | $0 \leq i \leq 55$ |
| $\sigma_i = g_i \forall h_{i+1} \forall l_{(i-56)}$ | $56 \leq i \leq 62$ |
| $\sigma_{63} = g_{63} \forall l_7$ | |
| $\omega_i = g_i h_{i+1}$ | $1 \leq i \leq 55$ |
| $\omega_i = g_i h_{i+1} + g_i l_{(i-56)} + h_{i+1} l_{(i-56)}$ | $56 \leq i \leq 62$ |
| $\omega_{63} = g_{63} + l_7$ | |

CSA6

| | |
|---|---|
| $\tau_i = g_i \forall \epsilon\_n_{i+1}$ | $0 \leq i \leq 38$ |
| $T_i = \overline{g_i + \epsilon\_n_{i+1}}$ | $1 \leq i \leq 38$ |

CSA5

| | |
|---|---|
| $\gamma_i = g_i \forall \overline{h_{i+1}}$ | $i = 32, 39$ |
| $\Gamma_i = \overline{g_i + \overline{h_{i+1}}}$ | $i = 32, 39$ |

CSA4

| | |
|---|---|
| $?_i = \overline{g_i} \forall \epsilon\_n_{i+1}$ | $i = 31, 38$ |
| $N_i = \overline{\overline{g_i} + \epsilon\_n_{i+1}}$ | $i = 31, 38$ |

CLA1

| | |
|---|---|
| $(\kappa H)_i = g_i \forall h_{i+1}$ | $56 \leq i \leq 63$ |
| $(\kappa G)_i\_N = \overline{g_i h_{i+1}}$ | $56 \leq i \leq 62$ |
| $(\kappa T)_i\_N = \overline{g_i + h_{i+1}}$ | $56 \leq i \leq 62$ |
| $(\kappa C)_{63}\_N = \overline{g_{63}}$ | |
| $(\kappa G)_i^{i+1} = \overline{(\kappa G)_i\_N((\kappa T)_i\_N + (\kappa G)_{i+1}\_N)}$ | $56 \leq i \leq 61$ |
| $(\kappa T)_i^{i+1} = \overline{(\kappa T)_i\_N + (\kappa T)_{i+1}\_N}$ | $56 \leq i \leq 61$ |
| $(\kappa C)_{62} = \overline{(\kappa G)_{62}\_N((\kappa T)_{62}\_N + (\kappa C)_{63}\_N)}$ | |
| $(\kappa C)_{63} = \overline{(\kappa C)_{63}\_N}$ | |
| $(\kappa G)_i^{i+3}\_N = \overline{(\kappa G)_1^{i+1} + (\kappa T)_1^{i+1}(\kappa G)_{1+2}^{i+3}}$ | $56 \leq i \leq 59$ |
| $(\kappa T)_i^{i+3}\_N = \overline{(\kappa T)_1^{i+1}(\kappa T)_{1+2}^{i+3}}$ | $56 \leq i \leq 59$ |
| $(\kappa C)_i\_N = \overline{(\kappa G)_1^{i+1} + (\kappa T)_1^{i+1}(\kappa C)_{i+2}}$ | $i = 60, 61$ |
| $(\kappa C)_i\_N = \overline{(\kappa C)_i}$ | $i = 62, 63$ |
| $\kappa_i = \overline{(\kappa G)_1^{i+3}\_N((\kappa T)_1^{i+3}\_N + (\kappa C)_{i+4}\_N)}$ | $57 \leq i \leq 59$ |
| $(\kappa C)_i = \overline{(\kappa C)_i\_N}$ | $60 \leq i \leq 63$ |
| $\kappa_{56} = \overline{(\kappa G)_{56}^{59}{}_{13}N((\kappa T)_{56}^{59}\_N + (\kappa C)_{60}\_N)}$ | |
| $S_i = (\kappa C)_{i+1} \forall (\kappa H)_i$ | $57 \leq i \leq 63$ |
| $S_{56} = \kappa_{57} \forall (\kappa H)_{56}$ | |

-continued $S_{63}\_N = \overline{S_{63}}$
<u>CG1</u>

$(\phi G)_i\_N = \overline{\phi_i \omega_{i+1}}$ $\qquad\qquad 56 \leq i \leq 62$ $(\phi T)_i\_N = \overline{\phi_i + \omega_{i+1}}$ $\qquad\qquad 56 \leq i \leq 62$ $(\phi C)_{63}\_N = \overline{\phi_{63} \omega_{64}}$ $(\phi G)_i^{i+1} = \overline{(\phi G)_i\_N((\phi T)_i\_N + (\phi G)_{i+1}\_N)}$ $\qquad\qquad i = 56, 58, 60$ $(\phi T)_i^{i+1} = \overline{(\phi T)_i\_N + (\phi T)_{i+1}\_N}$ $(\phi C)_{62} = \overline{(\phi G)_{62}\_N((\phi T)_{62}\_N + (\phi C)_{63}\_N)}$ $(\phi G)_{56}^{59}\_N = \overline{(\phi G)_{56}^{57} + (\phi T)_{56}^{57}(\phi G)_{58}^{59}}$ $(\phi T)_{56}^{59}\_N = \overline{(\phi T)_{56}^{57}(\phi T)_{58}^{59}}$ $(\phi C)_{60}\_N = \overline{(\phi G)_{60}^{61} + (\phi T)_{60}^{61}(\phi C)_{62}}$ $\phi_{56} = \overline{(\phi G)_{56}^{59}\_N((\phi T)_{56}^{59}\_N + (\phi C)_{60}\_N)}$
<u>XR7 and XR8</u>

$C_{56} = \kappa_{56} \forall \omega_{56} \forall \phi_{56}$
<u>A5</u>

$S_{=\ 0COR1}^\dagger = (\sigma_0 \forall \omega_1)(\sigma_1 \forall \omega_2) \ldots (\sigma_{54} \forall \omega_{55})(\sigma_{55} \forall \kappa_{56})$
$O_{MVCCOR1} = S_{=\ 0COR1}^\dagger C_{56}$
<u>A3</u>

$S_{=\ 0COR2}^\dagger = \sigma_0 \forall \omega_1)(\sigma_1 \forall \omega_2) \ldots (\sigma_{35} \forall \omega_{36})(\sigma_{36} \forall \omega_{37})(\phi_{37} \forall N_{38})(\nu_{36} \forall \Gamma_{39})(\gamma_{39} \forall \omega_{40})(\phi_{40} \forall \omega_{40})(\sigma_{40} \forall \omega_{41})$
$(\sigma_{41} \forall \omega_{42}) \ldots (\sigma_{54} \forall \omega_{55})(\sigma_{55} \forall \kappa_{56})$
$O_{MYCCOR2} = S_{=\ 0COR2}^\dagger C_{56}$
<u>A4</u>

$S_{=\ 0COR3}^\dagger = (\tau_0 \forall T_1)(\tau_1 \forall T_2) \ldots (\tau_{36} \forall T_{37})(\tau_{37} \forall T_{38})(\tau_{38} \forall \Gamma_{39})(\gamma_{39} \forall \omega_{40})(\phi_{40} \forall \omega_{41})(\sigma_{41} \forall \omega_{42}) \ldots$
$(\sigma_{54} \forall \omega_{55})(\sigma_{55} \forall \kappa_{56})$
$O_{MYCCOR3} = S_{=\ 0COR3}^\dagger C_{56}$
<u>A1</u>

$S_{=\ 0COR4}^\dagger = (\sigma_0 \forall \omega_1)(\sigma_1 \forall \omega_2) \ldots (\sigma_{28} \forall \omega_{29})(\sigma_{29} \forall \omega_{30})(\sigma_{30} \forall N_{31})(\nu_{31} \forall \Gamma_{32})(\gamma_{32} \forall \omega_{33})(\sigma_{33} \forall \omega_{34})$
$(\sigma_{34} \forall \omega_{35}) \ldots (\sigma_{54} \forall \omega_{55})(\sigma_{55} \forall \kappa_{56})$
$O_{MVCCOR4} = S_{=\ 0COR4}^\dagger C_{56}$
<u>A2</u>

$S_{=\ 0COR5}^\dagger = (\tau_0 \forall T_2) \ldots (\tau_{29} \forall T_{30})(\tau_{30} \forall T_{31})(\tau_{31} \forall \Gamma_{32})(\gamma_{32} \forall \omega_{33})(\sigma_{33} \forall \omega_{34})(\sigma_{34} \forall \omega_{35}) \ldots$
$(\sigma_{54} \forall \omega_{55})(\sigma_{55} \forall \kappa_{56})$
$O_{MYCCOR5} = S_{=\ 0COR5}^\dagger C_{56}$
<u>SAR1HI Detect 12 Bit Add</u>

$SAR1H_i = la_i \forall ra_{(i-52)}$ $\qquad\qquad 52 \leq i \leq 55$ $SAR1G_i\_N = \overline{la_i ra_{(i-52)}}$ $\qquad\qquad 52 \leq i \leq 62$ $SAR1T_i\_N = \overline{la_i + ra_{(i-52)}}$ $\qquad\qquad 52 \leq i \leq 62$ $SAR1C_{63}\_N1 = \overline{la_{63} ra_{11}}$ $SAR1H_i\_N = \overline{SAR1H_i}$ $\qquad\qquad 52 \leq i \leq 55$ $(SAR1G)_i^{i+1} = \overline{(SAR1G)_i\_N((SAR1T)_i\_N + (SAR1G)_{i+1}\_N)}$ $\qquad\qquad 52 \leq i \leq 61$ $(SAR1T)_i^{i+1} = \overline{((SAR1T)_i\_N + (SAR1T)_{i+1}\_N)}$ $\qquad\qquad 52 \leq i \leq 61$ $(SAR1C1)_{62} = \overline{(SAR1G)_{62}\_N((SAR1T)_{62}\_N + (SAR1C)_{63}\_N1)}$ $(SAR1C1)_{63} = \overline{(SAR1C)_{63}\_N1}$ $(SAR1G)_i^{i+3}\_N = \overline{(SAR1G)_i^{i+1} + (SAR1T)_i^{i+1}(SAR1G)_{i+2}^{i+3}}$ $\qquad\qquad 52 \leq i \leq 59$ $(SAR1T)_i^{i+3}\_N = \overline{(SAR1T)_i^{i+1}(SAR1T)_{i+2}^{i+3}}$ $\qquad\qquad 52 \leq i \leq 59$ $(SAR1C)_i\_N2 = \overline{(SAR1G)_i^{i+1} + (SAR1T)_i^{i+1}(SAR1C1)_{i+2}}$ $\qquad\qquad i = 60, 61$ $(SAR1C)_i\_N2 = \overline{(SAR1C1)_i}$ $\qquad\qquad i = 62, 63$ $(SAR1G)_i^{i+7} = \overline{(SAR1G)_i^{i+3}\_N((SAR1T)_i^{i+3}\_N + (SAR1G)_{i+4}^{i+7}\_N)}$ $\qquad\qquad 52 \leq i \leq 55$

| | |
|---|---|
| $(SAR1T)_i^{i+7} = \overline{(SAR1T)_i^{i+3}\_N+(SAR1T)_{i+4}^{i+7}\_N}$ | $52 \leq i \leq 55$ |
| $(SAR1C)_{56} = \overline{(SAR1G)_{56}^{59}N((SAR1T)_{56}^{59}\_N+(SAR1C)_{60}\_N2)}$ | 56 |
| $(SAR1C)_i = \overline{(SAR1C)_i\_N2}$ | $60 \leq i \leq 63$ |
| $(SAR1C)_i\_N = \overline{(SAR1G)_i^{i+7}+(SAR1T)_i^{i+7}(SAR1C)_{i+8}}$ | $52 \leq i \leq 55$ |
| $(SAR1C)_{56}\_N = \overline{(SAR1C)_{56}}$ | |
| $(SAR1_i\_N = \overline{(SAR1C)_{i+1}\_N \forall SAR1H_i}$ | $52 \leq i \leq 55$ |
| $SAR1_i = \overline{(SAR1C)_{i+1}\_N \wedge SAR1H_i\_N}$ | $52 \leq i \leq 55$ |
| $SAR1\_52\_to\_55\_ZEROS = (SAR1_{52}\_N)(SAR1_{53}\_N)(SAR1_{55}\_N)$ | |
| $SAR1\_52\_to\_55\_ONES = (SAR1_{52})(SAR1_{53})(SAR1_{54})(SAR1_{55})$ | |
| $(SAR1C)_{52} = \overline{(SAR1C)_{52}\_N}$ | |
| SAR1HI, SAR1LO, WRAP1 Detection Logic | |
| $la_i\_N = \overline{la_i}$ | $33 \leq i \leq 51$ |
| $la\_40\_TO\_51\_ZEROS = la_{40}\_N\, la_{41}\_N \ldots la_{50}\_N\, la_{51}\_N$ | |
| $la\_40\_TO\_50\_ONES\, la_{50}$ | |
| $la\_40\_TO\_51\_ONES = la\_40\_TO\_50\_ONES\, la_{51}$ | |
| $la\_40\_TO\_50\_ONES = la\_40\_TO\_50\_ONES\, la_{51}\_N$ | |
| $la\_33\_TO\_39\_ZEROS = la_{33}\_N\, la_{34}\_N \ldots la_{38}\_N\, la_{39}\_N$ | |
| $la\_33\_TO\_39\_ONES = la_{33} la_{34} \ldots la_{38} la_{39}$ | |
| $la\_33\_TO\_50\_ONES\_A\_51\_ZERO = la\_33\_TO\_39\_ONES\, la\_40\_TO\_50\_ONES\_A\_51\_ZERO$ | |
| $la\_33\_51\_ZEROS = la\_33\_TO\_39\_ZEROS\, la\_40\_TO\_51\_ZEROS$ | |
| $la\_33\_TO\_51\_ONES = la\_33\_TO\_39\_ONES\, la\_40\_TO\_51\_ONES$ | |
| $SAR1\_TO\_51\_0S = 24\_BIT\_MD\, la\_40\_TO\_51\_ZEROS + 31\_BIT\_MD\, la\_33\_TO\_51\_ZEROS$ | |
| $SAR1\_TO\_51\_1S = 24\_BIT\_MD\, la\_40\_TO\_51\_ONES + 31\_BIT\_MD\, la\_33\_TO\_51\_ONES$ | |
| $SAR1\_TO\_1S\_A\_51\_0 = 24\_BIT\_MD\, la\_40\_TO\_50\_OMES\_A\_51\_ZERO + 31\_BIT\_MD\, la\_33\_TO\_50\_ONES\_A\_51\_ZERO$ | |
| $SAR1LO = [(SAR1C)_{52}\_N\, SAR1\_TO\_51\_0S + (SAR1C)_{52}\, SAR1\_TO\_51\_aS]\, SAR1\_52\_TO\_55\_ZEROS$ | |
| $SAR1HI = [(SAR1C)_{52}\_N\, SAR1\_TO\_51\_1S + (SAR1C)_{52}\, SAR1\_TO\_50\_1S\_A\_51\_0]\, SAR1\_52\_to\_55\_ONES$ | |
| $WRAP1 = )SAR1C)_{52}\, SAR1\_TO\_51\_1S$ | |
| $WRAP1\_N = \overline{WRAP1}$ | |
| SAR2HI Detect 12 Bit Add | |
| $SAR2H_i = lh_i \forall rh_{(i-52)}$ | $52 \leq i \leq 55$ |
| $SAR2G_i\_N = \overline{lh_i rh_{(i-52)}}$ | $52 \leq i \leq 62$ |
| $SAR2T_i\_N = \overline{lh_i + rh_{(i-52)}}$ | $52 \leq i \leq 62$ |
| $SAR2C_{63}\_N1 = \overline{lh_{63} rh_{11}}$ | |
| $SAR2H_i\_N = \overline{SAR2H_i}$ | $52 \leq i \leq 55$ |
| $(SAR2G)_i^{i+1} = \overline{(SAR2G)_i\_N((SAR2T)_i\_N+(SAR2G)_{i+1}\_N)}$ | $52 \leq i \leq 61$ |
| $(SAR2T)_i^{i+1} = \overline{((SAR2T)_i\_N+(SAR2T)_{i+1}\_N)}$ | $52 \leq i \leq 61$ |
| $(SAR2C1)_{62} = \overline{(SAR2G)_{62}\_N((SAR2T)_{62}\_N+(SAR2C)_{63}\_N1)}$ | |
| $(SAR2C1)_{63} = \overline{(SAR2C)_{63}\_N1}$ | |
| $(SAR2G)_i^{i+3}\_N = \overline{(SAR2G)_i^{i+1}+(SAR2T)_i^{i+1}(SAR2G)_{i+2}^{i+3}}$ | $52 \leq i \leq 59$ |
| $(SAR2T)_i^{i+3}\_N = \overline{(SAR2T)_i^{i+1}(SAR2T)_{i+2}^{i+3}}$ | $52 \leq i \leq 59$ |
| $(SAR2C)_i\_N2 = \overline{(SAR2G)_i^{i+1}+(SAR2T)_i^{i+1}(SAR2C1)_{i+2}}$ | $i = 60, 61$ |
| $(SAR2C)_i\_N2 = \overline{(SAR2C1)_i}$ | $i = 62, 63$ |
| $(SAR2G)_i^{i+7} = \overline{(SAR2G)_i^{i+3}\_N((SAR2T)_i^{i+3}\_N+(SAR2G)_{i+4}^{i+7}\_N)}$ | $52 \leq i \leq 55$ |
| $(SAR2T)_i^{i+7} = \overline{(SAR2T)_i^{i+3}\_N+(SAR2T)_{i+4}^{i+7}\_N}$ | $52 \leq i \leq 55$ |
| $(SAR2C)_{56} = \overline{(SAR2G)_{56}^{59}N((SAR2T)_{56}^{59}\_N+(SAR2C)_{60}\_N2)}$ | 56 |
| $(SAR2C)_i = \overline{(SAR2C)_i\_N2}$ | $60 \leq i \leq 63$ |
| $(SAR2C)_i\_N = \overline{(SAR2G)_i^{i+7}+(SAR2T)_i^{i+7}(SAR2C)_{i+8}}$ | $52 \leq i \leq 55$ |
| $(SAR2C)_{56}\_N = \overline{(SAR2C)_{56}}$ | |
| $SAR2_i\_N = \overline{(SAR2C)_{i+1}\_N \wedge SAR2H_i}$ | $52 \leq i \leq 55$ |
| $SAR2_i = \overline{(SAR2C)_{i+1}\_N \wedge SAR2H_i\_N}$ | $52 \leq i \leq 55$ |
| $SAR2\_52\_to\_55\_ZEROS = (SAR2_{52}\_N)(SAR2_{53}\_N)(SAR2_{54}\_N)(SAR2_{55}\_N)$ | |
| $SAR2\_52\_to\_55\_ONES = (SAR2_{52})(SAR2_{53})(SAR2_{54})(SAR2_{55})$ | |

$(SAR2C)_{52} = \overline{(SAR2C)_{52}\_N}$
SAR2HI, SAR2LO, WRAP2 Detection Logic $lh_i\_N = \overline{lh_i}$  $\qquad 33 \leq i \leq 51$
$lh\_40\_TO\_51\_ZEROS = lh_{40}\_N\ lh_{41}\_N \ldots oh_{50}\_N\ lh_{51}\_N$
$lh\_40\_TO\_50\_ONES = lh_{40} lh_{41} \ldots lh_{50}$
$lh\_40\_TO\_51\_ONES = lh\_40\_TO\_50\_ONES\ lh_{51}$
$lh\_40\_TO\_50\_ONES\_A\_51\_ZERO = lh\_40\_TO\_50\_ONES\ lh_{51}\_N$
$lh\_33\_TO\_39\_ZEROS = lh_{33}\_N\ lh_{34}\_N \ldots lh_{38}\_N\ lh_{39}\_N$
$lh\_33\_TO\_39\_ONES = lh_{33} lh_{34} \ldots lh_{38} lh_{39}$
$lh\_33\_TO\_50\_ONES\_A\_51\_ZERO = lh\_33\_TO\_39\_ONES\ lh\_40\_TO\_50\_ONES\_A\_51\_ZERO$
$lh\_33\_TO\_51\_ZEROS = lh\_33\_TO\_39\_ZEROS\ lh\_40\_TO\_51\_ZEROS$
$lh\_33\_TO\_51\_ONES = lh\_33\_TO\_39\_ONES\ lh\_40\_TO\_51\_ONES$
$SAR2\_TO\_51\_0S = 24\_BIT\_MD\ lh\_40\_TO\_51\_ZEROS + 31\_BIT\_MD\ lh\_33\_TO\_51\_ZEROS$
$SAR2\_TO\_51\_1S = 24\_BIT\_MD\ lh\_40\_TO\_51\_ONES + 31\_BIT\_MD\ lh\_33\_TO.51\_ONES$
$SAR2\_TO\_50\_1Shd\ —A\_51\_0 = 24\_{1\ BIT}\_MD\ lh\_40\_TO\_50\_ONES\_A\_51\_ZERO +$
$31\_BIT\_MD\ lh\_33\_TO\_50\_ONES\_A\_51\_ZERO$
$SAR2LO = [(SAR2C)_{52}\_N\ SAR2\_TO\_51\_0S + (SAR2C)_{52}\ SAR2\_TO\_51\_1S]SAR2\_52\_TO\_55\_ZEROS$
$SAR2HI = [(SAR2C)_{52}\_N\ SAR2\_TO\_51\_1S + (SAR2C)_{52}\ SAR2\_TO\_50\_1S\_A\_51\_0]SAR2\_52\_to\_55\_ONES$
$WRAP2 = (SAR2C)_{52}\ SAR2\_TO\_51\_1S$ $WRAP2\_N = \overline{WRAP2}$
COR(1:5) Generation Logic $REMAP1\_N = \overline{SAR2HISAR2LO}$ $REMAP2\_N = \overline{SAR2LOSAR1HI}$ $REMAP1 = \overline{REMAP1\_N}$ $REMAP2 = \overline{REMAP2\_N}$
$COR(1) = 64\_BIT\_MD + REMAP1\_N\ WRAP1\_N\ WRAP2\_N + WRAP2\ WRAP1$
$COR(2) = 24\_BIT\_MD\ REMAP1\_N\ WRAP2\_N\ WRAP1$
$COR(3) = 24\_BIT\_MD\ WRAP2\ WRAP1\_N + 24\_BIT\_MD\ REMAP1\ WRAP1\_N$
$COR(4) = 31\_BIT\_MD\ REMAP1\_N\ WRAP2\_N\ WRAP1$
$COR(5) = 31\_BIT\_MD\ WRAP2\ WRAP1\_N + 31\_BIT\_MD\ REMAP1\ WRAP1\_N$
OVERLAP Generation Logic
$OVERLAP = COR(1)\ O_{MVCCOR1} + COR(2)\ O_{MVCCOR2} + COR(3)\ O_{MVCCOR3} + COR(4)\ O_{MVCCOR4} +$
$COR(5)\ O_{MVCCOR5}$ While we have described our preferred embodiments of our invention, it will be understood that those skilled in the art, both now and in the future, may make make various improvements and enhancements which fall within the scope of the claims which follow. These claims should be construed to maintain the proper protection for the invention first disclosed.

What is claimed is:

1. A system to predict destructive overlap between a first operand and a second operand stored in a memory, said first operand including a first base address and a displacement from the first base address and said second storage operand including a second base address and a displacement from the second base address, comprising in combination:

first means responsive to said first base address and to said displacement from the first base address to detect a wrap condition of said first operand in said memory and to detect the presence of said first operand in a high block of said memory;

second means responsive to said second base address and to said displacement from the second base address to detect a wrap condition of said second operand in said memory and to detect the presence of said second operand in a low block of said memory;

means responsive to said first means and said second means to generate an overlap correction factor in predicting a destructive overlap between said first operand and said second operand;

a storage operand overlap predictor responsive to said first base address, said displacement from said first base address, said second base address, said displacement from said second base address, and said overlap correction factor to generate an output indicative of a destructive overlap between said first operand and said second operand.

2. A system to predict destructive overlap as in claim 1 wherein said first means is a source storage operand address high and wrap detector and said second means is a destination storage operand address low and wrap detector.

3. The system to predict destructive overlap of claim 2 wherein overlap is predicted from inputs used for generating a destination storage operand address and a source storage operand address along with an operand length and performed in parallel with a calculation of the source and destination storage operand addresses.

4. The system to predict destructive overlap of claim 2 wherein in the destination storage operand address low and wrap detector it is determined that a destination operand address lies in a low 256 byte block of a virtual address and whether wrapping from a high 4K block of the virtual address to a low 4K block of the virtual address space occurs during address generation.

5. The system to predict destructive overlap of claim 2 wherein in the destination storage operand address low and wrap detector a 64 bit input, Ia, is supplied the first base address while a 12 bit input, ra, is supplied the displacement used for calculating a destination storage operand address.

6. The system to predict destructive overlap of claim 2 wherein in the source storage operand high and wrap detector it is determined that a source operand address lies in a high 256 byte block of a virtual address space and whether wrapping from a high 4K block of the virtual address space to the low 4K block of the virtual address space occurs during address generation.

7. The system to predict destructive overlap of claim 2 wherein the source stage operand high and wrap detector includes a 64 bit input, Ih, supplied a base while a 12 bit input, rh, is supplied a displacement used for calculating a destination storage operand address.

* * * * *